United States Patent
Saito

(10) Patent No.: US 12,166,237 B2
(45) Date of Patent: Dec. 10, 2024

(54) AIR ELECTRODE/SEPARATOR ASSEMBLY AND ZINC-AIR SECONDARY BATTERY

(71) Applicant: NGK INSULATORS, LTD., Nagoya (JP)

(72) Inventor: Naomi Saito, Nagoya (JP)

(73) Assignee: NGK INSULATORS, LTD., Nagoya (JP)

(*) Notice: Subject to any disclaimer, the term of this patent is extended or adjusted under 35 U.S.C. 154(b) by 420 days.

(21) Appl. No.: 17/575,851

(22) Filed: Jan. 14, 2022

(65) Prior Publication Data
US 2022/0140439 A1 May 5, 2022

Related U.S. Application Data

(63) Continuation of application No. PCT/JP2020/035146, filed on Sep. 16, 2020.

(30) Foreign Application Priority Data

Sep. 25, 2019 (JP) .................................. 2019-174429

(51) Int. Cl.
| | |
|---|---|
| H01M 50/451 | (2021.01) |
| H01M 4/24 | (2006.01) |
| H01M 4/66 | (2006.01) |
| H01M 4/80 | (2006.01) |
| H01M 12/08 | (2006.01) |
| H01M 50/466 | (2021.01) |
| H01M 4/02 | (2006.01) |

(52) U.S. Cl.
CPC .......... *H01M 50/451* (2021.01); *H01M 4/244* (2013.01); *H01M 4/66* (2013.01);
(Continued)

(58) Field of Classification Search
CPC ...... H01M 50/451; H01M 4/244; H01M 4/66; H01M 4/80; H01M 12/08; H01M 50/466;
(Continued)

(56) References Cited

U.S. PATENT DOCUMENTS

| | | |
|---|---|---|
| 9,070,953 B2 | 6/2015 | Yamada et al. |
| 10,290,847 B2 | 5/2019 | Kitoh et al. |
| (Continued) | | |

FOREIGN PATENT DOCUMENTS

| | | |
|---|---|---|
| JP | 2017-004854 A | 1/2017 |
| JP | 2019-128987 A | 8/2019 |
| (Continued) | | |

OTHER PUBLICATIONS

International Search Report and Written Opinion (Application No. PCT/JP2020/035146) dated Nov. 24, 2020 (with English translation).

*Primary Examiner* — Stewart A Fraser
(74) *Attorney, Agent, or Firm* — BURR PATENT LAW, PLLC

(57) ABSTRACT

Provided is an air electrode/LDH separator assembly including: a rigid porous layer having rigidity and air permeability, wherein the rigidity is defined as a proportion of displacement in a compression direction of less than 3% when pressurized at 0.1 MPa; an air electrode layer that covers both sides of the rigid porous layer, or both sides and end faces of the rigid porous layer provided that at least one end face is excluded; and a layered double hydroxide (LDH) separator that covers an outside of the air electrode layer; wherein i) the rigid porous layer is made of a metal or an electrically conductive ceramic, whereby the rigid porous layer itself functions as a positive electrode current collector, or ii) the rigid porous layer is made of an insulating material and is covered with a porous metal layer, whereby the porous metal layer functions as a positive electrode current collector.

27 Claims, 19 Drawing Sheets

(52) U.S. Cl.
CPC ............. *H01M 4/80* (2013.01); *H01M 12/08* (2013.01); *H01M 50/466* (2021.01); *H01M 2004/027* (2013.01); *H01M 2004/028* (2013.01)

(58) Field of Classification Search
CPC ..... H01M 2004/027; H01M 2004/028; H01M 4/38; H01M 4/42; H01M 4/64; H01M 50/409
See application file for complete search history.

(56) References Cited

U.S. PATENT DOCUMENTS

| | | |
|---|---|---|
| 10,892,530 B2 | 1/2021 | Yamamura et al. |
| 2017/0214019 A1 | 7/2017 | Yokoyama et al. |
| 2017/0222271 A1* | 8/2017 | Hayashi ................ H01M 10/26 |
| 2018/0083246 A1* | 3/2018 | Gonda ................ H01M 50/489 |
| 2018/0248165 A1* | 8/2018 | Gonda ................ H01M 50/434 |
| 2019/0267597 A1 | 8/2019 | Gonda et al. |
| 2020/0220158 A1 | 7/2020 | Matsuya et al. |

FOREIGN PATENT DOCUMENTS

| | | |
|---|---|---|
| WO | 2013/073292 A1 | 5/2013 |
| WO | 2015/146671 A1 | 10/2015 |
| WO | 2016/067884 A1 | 5/2016 |
| WO | 2016/076047 A1 | 5/2016 |
| WO | 2018/105178 A1 | 6/2018 |
| WO | 2018/163353 A1 | 9/2018 |
| WO | 2019/069760 A1 | 4/2019 |
| WO | 2019/069762 A1 | 4/2019 |
| WO | 2019/077953 A1 | 4/2019 |

* cited by examiner

AIR ELECTRODE/SEPARATOR ASSEMBLY AND ZINC-AIR SECONDARY BATTERY

CROSS-REFERENCE TO RELATED APPLICATIONS

This application is a continuation application of PCT/JP2020/035146 filed Sep. 16, 2020, which claims priority to Japanese Patent Application No. 2019-174429 filed Sep. 25, 2019, the entire contents all of which are incorporated herein by reference.

BACKGROUND OF THE INVENTION

1. Field of the Invention

The present disclosure relates to an air electrode/separator assembly and zinc-air secondary battery.

2. Description of the Related Art

One of the innovative battery candidates is a metal-air secondary battery. In the metal-air secondary battery, oxygen as a positive electrode active material is supplied from the air, and the space inside the battery container can thus be utilized to the maximum extent for filling the negative electrode active material, whereby in principle a high energy density is realized. For example, in a zinc-air secondary battery, in which zinc is used as a negative electrode active material, an alkaline aqueous solution such as potassium hydroxide is used as an electrolyte, and a separator (partition membrane) is used to prevent a short circuit between positive and negative electrodes. Upon discharge, $O_2$ is reduced on an air electrode (positive electrode) side to generate $OH^-$, while zinc is oxidized on a negative electrode to generate ZnO, as shown in the following reaction formulas.

Positive electrode: $O_2 + 2H_2O + 4e^- \rightarrow 4OH^-$

Negative electrode: $2Zn + 4OH^- \rightarrow 2ZnO + 2H_2O + 4e^-$

By the way, it is known that in zinc secondary batteries such as a zinc-air secondary battery and nickel-zinc secondary battery, metallic zinc in a dendrite form precipitates from a negative electrode upon charge, penetrates voids of a separator such as a nonwoven fabric, and reaches a positive electrode, resulting in occurrence of a short circuit. This short circuit due to such zinc dendrites leads to shorten repeated charge/discharge life.

Moreover, another problem with the zinc-air secondary battery is that carbon dioxide in the air passes through the air electrode, dissolves in the electrolyte, and precipitates an alkali carbonate to deteriorate the battery performance. Similar problems as described above can occur with lithium-air secondary batteries.

In order to deal with the problems described above, a battery comprising a layered double hydroxide (LDH) separator that blocks the penetration of zinc dendrite while selectively permeating hydroxide ions has been proposed. For example, Patent Literature 1 (WO2013/073292) discloses a zinc-air secondary battery including a LDH separator provided between an air electrode and a negative electrode in order to prevent both the short circuit between the positive and negative electrodes due to zinc dendrite and the inclusion of carbon dioxide. Patent Literature 2 (WO2016/076047) discloses a separator structure comprising an LDH separator fitted or joined to a resin outer frame, wherein the LDH separator has a high denseness such that it has a gas impermeability and/or water impermeability. Moreover, the literature also discloses that the LDH separator can be composited with a porous substrate. Further, Patent Literature 3 (WO2016/067884) discloses various methods for forming an LDH dense membrane on a surface of a porous substrate to obtain a composite material (LDH separator). This method comprises steps of uniformly adhering a starting material that can impart a starting point for LDH crystal growth to the porous substrate, treating hydrothermally the porous substrate in a raw material aqueous solution to form an LDH dense membrane on a surface of the porous substrate. Moreover, Patent Literature 4 (WO2019/069762) discloses a method for efficiently producing a negative electrode structure suitable for a zinc secondary battery (in particular a stacked-cell battery thereof) capable of inhibiting zinc dendrite propagation by covering or enveloping an entire negative electrode active material layer with a liquid retaining member and an LDH separator.

Moreover, in a field of metal-air secondary batteries such as a zinc-air secondary battery, an air electrode/separator assembly in which an air electrode layer is provided on an LDH separator has been proposed. Patent Literature 5 (WO2015/146671) discloses an air electrode/separator assembly comprising an LDH separator and an air electrode layer thereon, the air electrode layer containing an air electrode catalyst, an electron conductive material, and a hydroxide ion conductive material. Further, Patent Literature 6 (WO2018/163353) discloses a method for producing an air electrode/separator assembly by directly joining an air electrode layer containing LDH and carbon nanotubes (CNT) on an LDH separator.

CITATION LIST

Patent Literature

Patent Literature 1: WO2013/073292
Patent Literature 2: WO2016/076047
Patent Literature 3: WO2016/067884
Patent Literature 4: WO2019/069762
Patent Literature 5: WO2015/146671
Patent Literature 6: WO2018/163353

SUMMARY OF THE INVENTION

As described above, the metal-air secondary battery including an LDH separator has an excellent advantage of preventing both a short circuit between the positive and negative electrodes due to the metal dendrite and an inclusion of carbon dioxide. Further, it also has an advantage of being capable of inhibiting evaporation of water contained in the electrolyte due to the denseness of the LDH separator. Then, for obtaining a high voltage or a large current, it is convenient that a plurality of air electrodes/LDH separator assemblies and a plurality of negative electrode plates are alternately provided to enable to construct a stacked-cell battery. However, there exist various technical restrictions or requirements for constructing a stacked-cell battery. For example, a) it is necessary to efficiently take in an outside air into the air electrode, b) the LDH separator has gas impermeability and water impermeability due to its denseness, and c) in view of improving battery performance, the air electrode/separator/negative electrode plate are desired to adhered to one another. Therefore, there is a need for an air electrode/LDH separator assembly that enables construction of a stacked-cell battery without impairing original functions of the LDH separator and the zinc-air secondary battery.

The present inventors have now found that by combining a rigid porous layer having predetermined rigidity and air permeability, an air electrode layer, and an LDH separator, it is possible to provide an air electrode/LDH separator assembly capable of conveniently constructing a zinc-air secondary battery in a stacked-cell battery form suitable for supplying a high voltage or a large current, without impairing the original functions of the LDH separator and the air electrode.

Therefore, one of the objects of the present invention is to provide an air electrode/LDH separator assembly capable of conveniently constructing a zinc-air secondary battery in a stacked-cell battery form suitable for supplying a high voltage or a large current, without impairing the original functions of the LDH separator and the air electrode. Another object of the present invention is to provide a zinc-air secondary battery in a stacked-cell battery form including a plurality of the air electrode/separator assemblies.

According to an aspect of the present invention, there is provided an air electrode/separator assembly, comprising:
- a rigid porous layer having rigidity and air permeability, wherein the rigidity is defined as a proportion of displacement in a compression direction of less than 3% when pressurized at 0.1 MPa,
- an air electrode layer that covers both sides of the rigid porous layer, or both sides and end faces of the rigid porous layer provided that at least one end face is excluded, and
- a layered double hydroxide (LDH) separator that covers an outside of the air electrode layer, wherein:
i) the rigid porous layer is made of a metal or an electrically conductive ceramic, whereby the rigid porous layer itself functions as a positive electrode current collector, or
ii) the rigid porous layer is made of an insulating material and is covered with a porous metal layer, whereby the porous metal layer functions as a positive electrode current collector.

According to another aspect of the present invention, there is provided a zinc-air secondary battery comprising the air electrode/separator assemblies, comprising:
- a plurality of the air electrode/separator assemblies,
- a plurality of negative electrode plates alternating with the air electrode/separator assemblies, and comprising a negative electrode active material layer comprising at least one selected from the group consisting of zinc, zinc oxide, a zinc alloy and a zinc compound, and a negative electrode current collector,
- an electrolyte permeating the negative electrode plate and the LDH separator,
- a battery case that houses vertically the plurality of air electrode/separator assemblies, the plurality of negative electrode plates, and the electrolyte,
wherein the plurality of negative electrode plates and the electrolyte are housed in a closed space defined by the battery case and the plurality of air electrode/separator assemblies, leaving an upper surplus space, and the plurality of air electrode/separator assemblies are allowed to contact an outside air through an opening of the battery case, and
wherein the battery case further comprises a pressure release valve that enables release of a gas that may be generated inside the battery, at a position facing or communicating with the upper surplus space.

According to the first preferred embodiment of the present invention, there is provided the zinc-air secondary battery, wherein the plurality of air electrode/separator assemblies are disposed so that end faces of the rigid porous layers not covered with the LDH separators face upward,
wherein the zinc-air secondary battery comprises:
- a positive electrode current collecting member connected to upper ends of the plurality of positive electrode current collectors via end faces of the rigid porous layers not covered with the LDH separators,
- a positive electrode current collector terminal connected to the positive electrode current collecting member and extending from the battery case,
- a plurality of negative electrode current collector tabs extending laterally from lateral end portions of the plurality of negative electrode current collectors, and
- a negative electrode current collector terminal connected to the plurality of negative electrode current collector tabs and extending from the battery case.

According to the second preferred embodiment of the present invention, there is provided the zinc-air secondary battery, wherein the plurality of air electrode/separator assemblies are disposed so that end faces of the rigid porous layers not covered with the LDH separators face upward,
wherein the zinc-air secondary battery comprises:
- a positive electrode current collecting member connected to upper ends of the plurality of positive electrode current collectors via end faces of the rigid porous layers not covered with the LDH separators,
- a positive electrode current collector terminal connected to the positive electrode current collecting member and extending from the battery case,
- a plurality of negative electrode current collector tabs extending upward and/or laterally from upper ends of the plurality of negative electrode current collectors, and
- a negative electrode current collector terminal connected to the plurality of negative electrode current collector tabs and extending from the battery case.

According to the third preferred embodiment of the present invention, there is provided the zinc-air secondary battery, wherein the plurality of air electrode/separator assemblies are disposed so that end faces of the rigid porous layers not covered with the LDH separator face downward,
wherein the zinc-air secondary battery comprises:
- a positive electrode current collecting member connected to lower ends of the plurality of positive electrode current collectors via end faces of the rigid porous layers not covered with the LDH separators,
- a positive electrode current collector terminal connected to the positive electrode current collecting member and extends from the battery case,
- a negative electrode current collecting member provided in the upper surplus space and connected to upper ends of the plurality of negative electrode current collectors, and
- a negative electrode current collector terminal connected to the negative electrode current collecting member and extending from the battery case.

According to the fourth preferred embodiment of the present invention, there is provided the zinc-air secondary battery, wherein the plurality of air electrode/separator assemblies are disposed so that end faces of the rigid porous layers not covered with the LDH separator face downward, wherein the zinc-air secondary battery comprises:
a positive electrode current collecting member connected to lower ends of the plurality of positive electrode current collectors via end faces of the rigid porous layers not covered with the LDH separators,
a positive electrode current collector terminal connected to the positive electrode current collecting member and extending from the battery case,
a negative electrode current collecting member provided in the upper surplus space and connected to upper ends of the plurality of negative electrode current collectors, and
a negative electrode current collector terminal connected to the negative electrode current collecting member and extending from an upper surface of the battery case, and
wherein the LDH separator is configured in a continuous elongated shape facing the plurality of air electrode/separator assemblies and the plurality of negative electrode plates, the elongated LDH separator is formed into a zigzag folded structure, and a laminate of the air electrode layer and the rigid porous layer, and the negative electrode plate are alternately housed in a plurality of compartments defined by the zigzag folded structure, whereby the air electrode layer and the negative electrode plate are separated from each other via the LDH separator.

According to the fifth preferred embodiment of the present invention, there is provided the zinc-air secondary battery, wherein the plurality of air electrode/separator assemblies are disposed so that end faces of the rigid porous layers not covered with the LDH separators face downward,
wherein the zinc-air secondary battery comprises:
a positive electrode current collecting member connected to lower ends of the plurality of positive electrode current collectors via end faces of the rigid porous layers not covered with the LDH separators,
a positive electrode current collector terminal connected to the positive electrode current collecting member and extending from the battery case,
a negative electrode current collecting member provided in the upper surplus space and connected to upper ends of the plurality of negative electrode current collectors, and
a negative electrode current collector terminal connected to the negative electrode current collecting member and extending from a side surface of the battery case, and
wherein the LDH separator is configured in a continuous elongated shape facing the plurality of air electrode/separator assemblies and the plurality of negative electrode plates, the elongated LDH separator is formed into a zigzag folded structure, and a laminate of the air electrode layer and the rigid porous layer, and the negative electrode plate are alternately housed in a plurality of compartments defined by the zigzag folded structure, whereby the air electrode layer and the negative electrode plate are separated from each other via the LDH separator.

DETAILED DESCRIPTION OF THE INVENTION

Air Electrode/Separator Assembly

Figure 1A:
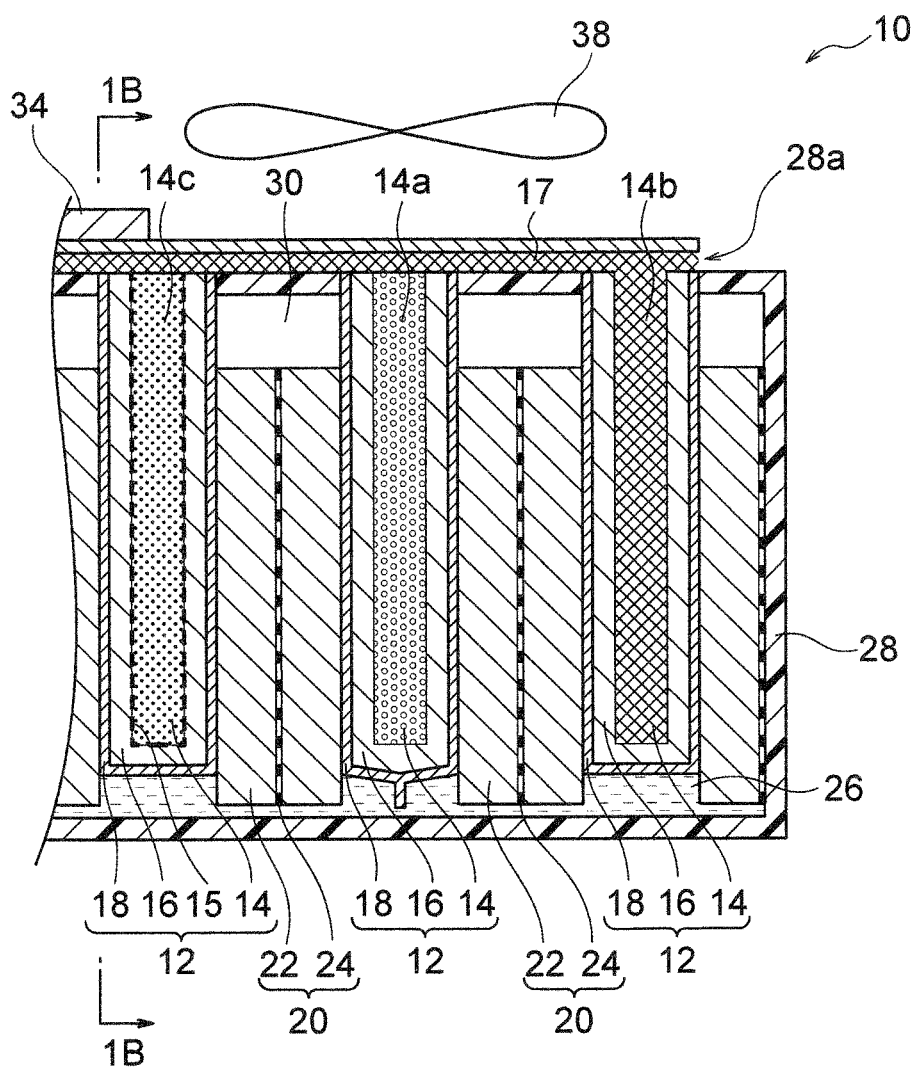
FIG. 1A is a schematic cross-sectional view conceptually illustrating an embodiment (first preferred embodiment) of a zinc-air secondary battery comprising air electrode/separator assemblies according to a plurality of embodiments according to the present invention.
Figure 1B:
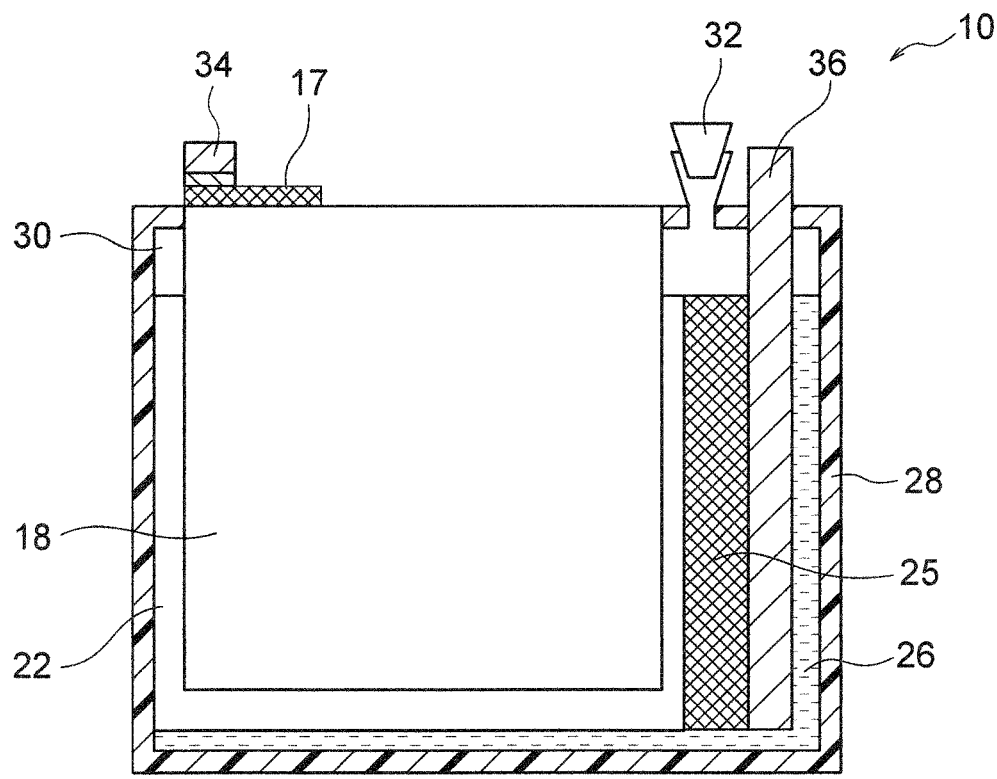
FIG. 1B is a cross-sectional view along the line 1B-1B of the zinc-air secondary battery shown in FIG. 1A.
Figure 1C:
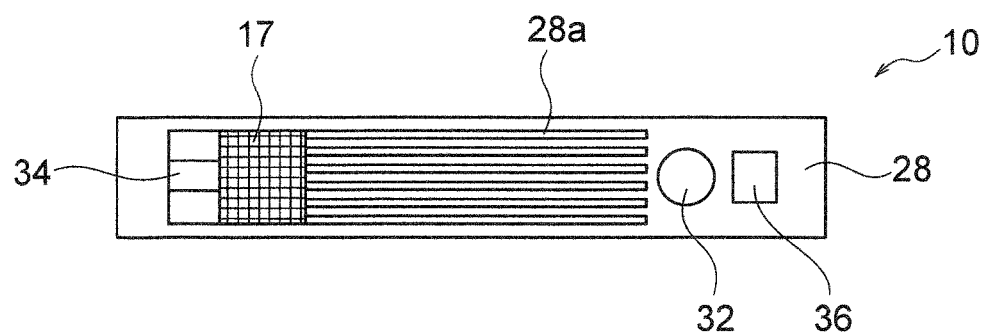
FIG. 1C is a top view of the zinc-air secondary battery shown in FIG. 1A.

FIGS. 1A to 1C show one embodiment of a zinc-air secondary battery 10 comprising air electrode/separator assemblies 12. Air electrode/separator assembly 12 comprises a rigid porous layer 14, an air electrode layer 16, and a layered double hydroxide (LDH) separator 18. Rigid porous layer 14 has rigidity and air permeability. This rigidity is defined as a displacement in the compression direction (typically in the thickness direction) of less than 3% when rigid porous layer 14 is pressurized at 0.1 MPa. Air electrode layer 16 covers both sides of rigid porous layer 14, or both sides and end faces of rigid porous layer 14 (provided that at least one end face is excluded). LDH separator 18 covers the outside of air electrode layer 16. Then, i) rigid porous layer 14 can be made of a metal such as a porous metal 14a or a metal mesh 14b or an electrically conductive ceramic, whereby rigid porous layer 14 itself can function as a positive electrode current collector. Alternatively, ii) rigid porous layer 14 can be made of an insulating material such as a porous resin 14c, and covering rigid porous layer 14 with a porous metal layer 15 allows porous metal layer 15 to function as a positive electrode current collector. Incidentally, zinc-air secondary battery 10 shown in FIG. 1 is drawn for the sake of convenience of explanation, assuming that both air electrode/separator assemblies 12 in forms i) and ii) are adopted; however, in the air electrode/separator assemblies of the present invention, only the aforementioned i) or only the ii) may be adopted. In any case, by combining rigid porous layer 14 having predetermined rigidity and air permeability, air electrode layer 16, and LDH separator 18, air electrode/LDH separator assembly 12 that is capable of conveniently constructing a zinc-air secondary battery 10 in a stacked-cell battery form without impairing the original functions of LDH separator 18 and air electrode layer 16 can be provided. Then, according to zinc-air secondary battery 10 in the stacked-cell battery form, it is possible to obtain a high voltage and a large current that cannot be obtained in a zinc-air secondary battery in a form of a single cell.

As described above, metal-air secondary batteries using LDH separators have various excellent advantages; however, there exist various technical restrictions or requirements for constructing a stacked-cell battery, such as a) it is necessary to efficiently take in an outside air into the air electrode, b) the LDH separator has gas impermeability and water impermeability due to its denseness, and c) in view of improving battery performance, the air electrode/separator/negative electrode plate are desired to adhered to one another. In this respect, according to air electrode/separator assembly 12 of the present invention, it is capable of conveniently constructing zinc-air secondary battery 10 in the stacked-cell battery form suitable for supplying a high voltage or a large current, without impairing the original functions of LDH separator 18 and air electrode layer 16, while satisfying such various technical restrictions and requirements.

Namely, rigid porous layer 14 having the rigidity and air permeability, wherein the rigidity is defined by the proportion of displacement in the compression direction of less than 3% when pressurized at 0.1 MPa. Accordingly, rigid porous layer 14 housed together with other components (negative electrode, etc.) in a battery container can be pressurized in the direction such that the battery components are adhered to one another. Such pressurization is particularly advantageous when a plurality of air electrode/separator assemblies 12 are alternately incorporated into a battery case 28 together with a plurality of negative electrode plates 20 to constitute a stacked-cell battery. Similarly, it is also advantageous when a plurality of laminated batteries are housed in one module container to constitute a battery module. For example, pressurizing zinc-air secondary battery 10 not only allows the battery components to be tightly packed in battery case 28 in a space efficient manner, but also minimizes the gap (preferably eliminates the gap) between negative electrode plate 20 and LDH separator 18 which gap allows growth of zinc dendrite, whereby effective inhibition of the zinc dendrite propagation can be expected. Then, although pressurizing in the direction such that each battery components are adhered to one another, rigid porous layer 14 itself can function as a gas flow path and also as a spacer (and, in some cases, a positive electrode current collector) due to the air permeability of rigid porous layer 14, whereby the outside air (particularly oxygen and water vapor) necessary for the positive electrode reaction can be sufficiently taken into air electrode layer 16. As a result, the potential catalytic performance of air electrode layer 16 can be maximized.

Rigid porous layer 14 has the rigidity and air permeability, wherein the rigidity is defined by the proportion of displacement in the compression direction of less than 3% when pressurized at 0.1 MPa. Whether or not the proportion of displacement in the compression direction is less than 3% when rigid porous layer 14 is pressurized at 0.1 MPa, can be determined by evaluating the relationship between the load and the displacement with a compression tester. For example, AGX (250N) manufactured by Shimadzu Corporation is used as a compression tester, a test piece is cut into a size of 30 mm square, and a load is applied to the test piece in the thickness direction at a crosshead feed rate of 0.5 mm/min. The amount of displacement with respect to the load is obtained, and the amount of the displacement in the thickness of the test piece, D, upon 0.1 MPa pressurization is divided by the initial thickness of the test piece, T, and then multiplied by 100 to obtain a proportion of displacement (%) (=(D/T)×100). The air permeability of rigid porous layer 14 may be a degree such that an outside air (particularly oxygen and water vapor) necessary for the positive electrode reaction can reach air electrode layer 16 through rigid porous layer 14. The thickness of rigid porous layer 14 is not particularly limited as long as it can secure air permeability, and the thickness of rigid porous layer 14 is preferably 0.3 mm or more, more preferably 0.5 mm or more, and still more preferably 1.0 mm or more. For the upper limit, the thickness of rigid porous layer 14 is not particularly limited, but is typically 5.0 mm or less, and more typically 3.0 mm or less.

Figure 6A:
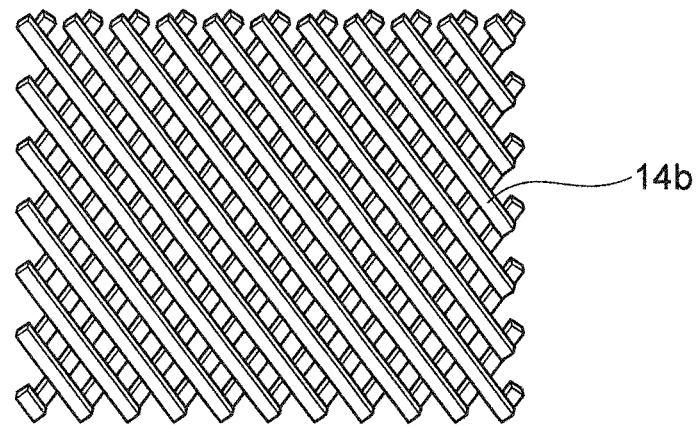
FIG. 6A is a view illustrating an example of a rigid porous layer used in the present invention.
Figure 6B:
FIG. 6B is a top view of the rigid porous layer shown in FIG. 6A.
Figure 7A:
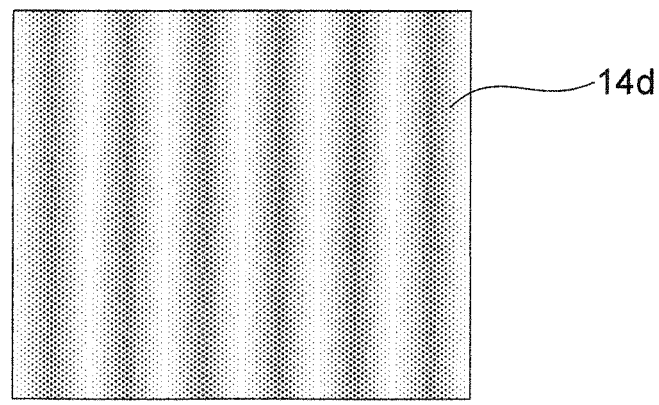
FIG. 7A is a view illustrating another example of a rigid porous layer used in the present invention.
Figure 7B:
FIG. 7B is a top view of the rigid porous layer shown in FIG. 7A.

Rigid porous layer 14 can be made of metal or electrically conductive ceramic. In this way, rigid porous layer 14 itself can function as a positive electrode current collector. Namely, rigid porous layer 14 itself can function as a gas flow path and also as both a spacer and a positive electrode current collector. Rigid porous layer 14 is preferably made of metal. Preferred examples of a metal constituting rigid porous layer 14 include stainless steel, titanium, nickel, brass, copper, etc. The form of rigid porous layer 14 when made of metal is not particularly limited as long as a predetermined rigidity and air permeability can be secured, and, preferred examples include a porous metal 14*a*, a metal mesh 14*b*, and a concave-convex metal plate 14*d* (see FIG. 7B). Examples of porous metal 14*a* include metal products having open pores such as a foamed metal and a sintered porous metal. An example of metal mesh 14*b* includes a laminated product of a metal mesh or a metal mesh in laminated form, and also may be a waffle-cut laminated product as shown in FIGS. 6A and 6B, for example. As shown in FIGS. 7A and 7B, an undulatory porous metal plate such as a punching metal may be used as concave-convex metal plate 14*d*. Rigid porous layer 14 can have a desired thickness while securing desired air permeability, by adopting the laminated form or the concave-convex shape. When the metal material constituting rigid porous layer 14 is a microporous material, liquid absorption can be expected, and it can also function as a water reservoir necessary for the positive electrode reaction.

Alternatively, rigid porous layer 14 may be made of an insulating material. A preferred example of the insulating material constituting rigid porous layer 14 includes an insulating resin. The form of rigid porous layer 14 in the case of being made of the insulating resin, is not particularly limited as long as a predetermined rigidity and air permeability can be secured, and preferred examples thereof include porous resin 14*c* and a resin plate having a concave-convex shape. When rigid porous layer 14 is made of an insulating material, rigid porous layer 14 is preferably covered with porous metal layer 15. In such a way, the surface covered with porous metal layer 15 can function as a positive electrode current collector while rigid porous layer 14 itself maintains an insulating property. A preferred example of porous metal layer 15 includes a metal mesh, etc. When the insulating material constituting rigid porous layer 14 is a microporous material having hydrophilicity, liquid absorption can be expected, and it can also function as a water reservoir necessary for the positive electrode reaction.

Figure 3A:
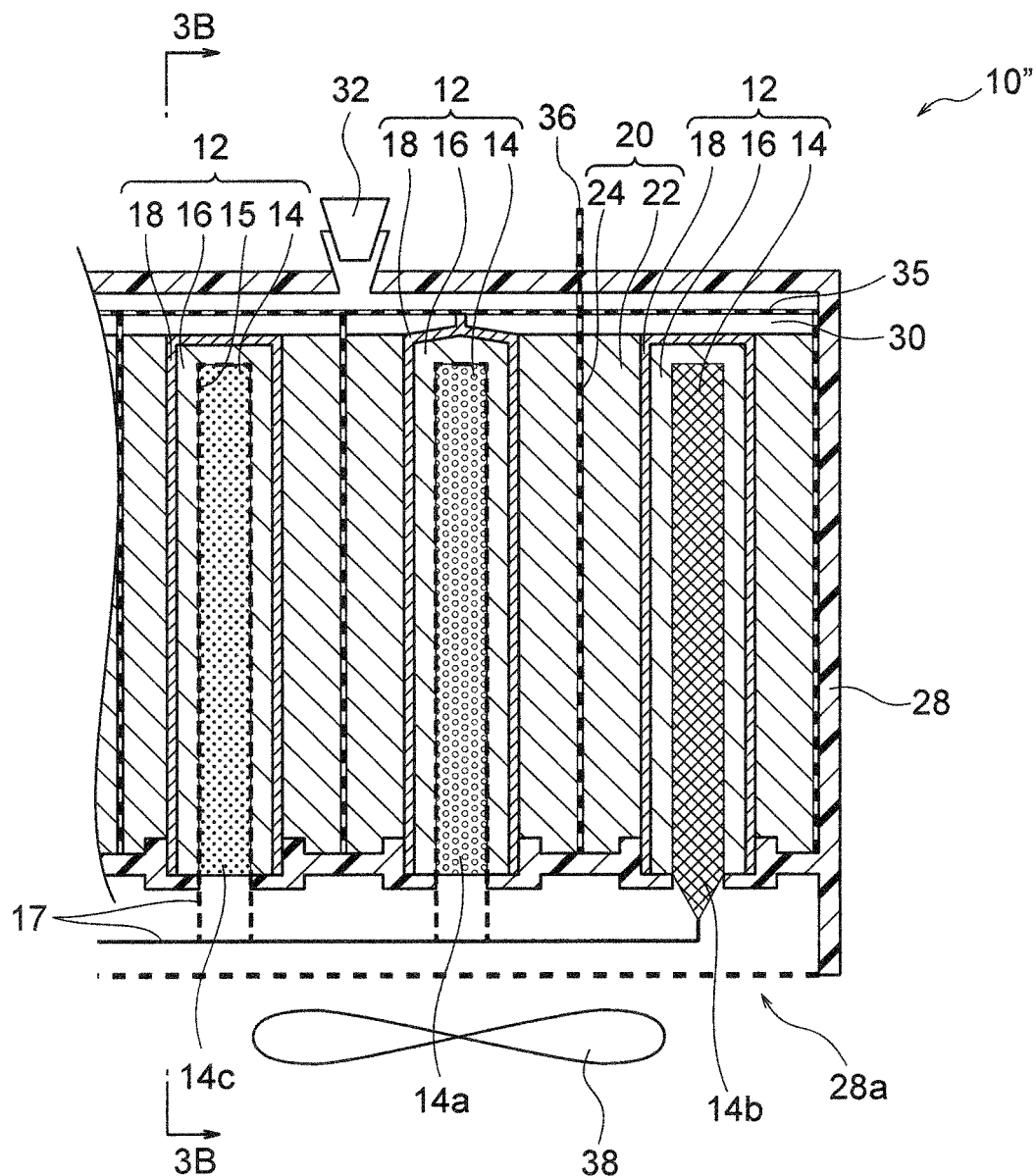
FIG. 3A is a schematic cross-sectional view conceptually illustrating still another embodiment (third preferred embodiment) of a zinc-air secondary battery comprising air electrode/separator assemblies according to a plurality of embodiments according to the present invention.
Figure 3B:
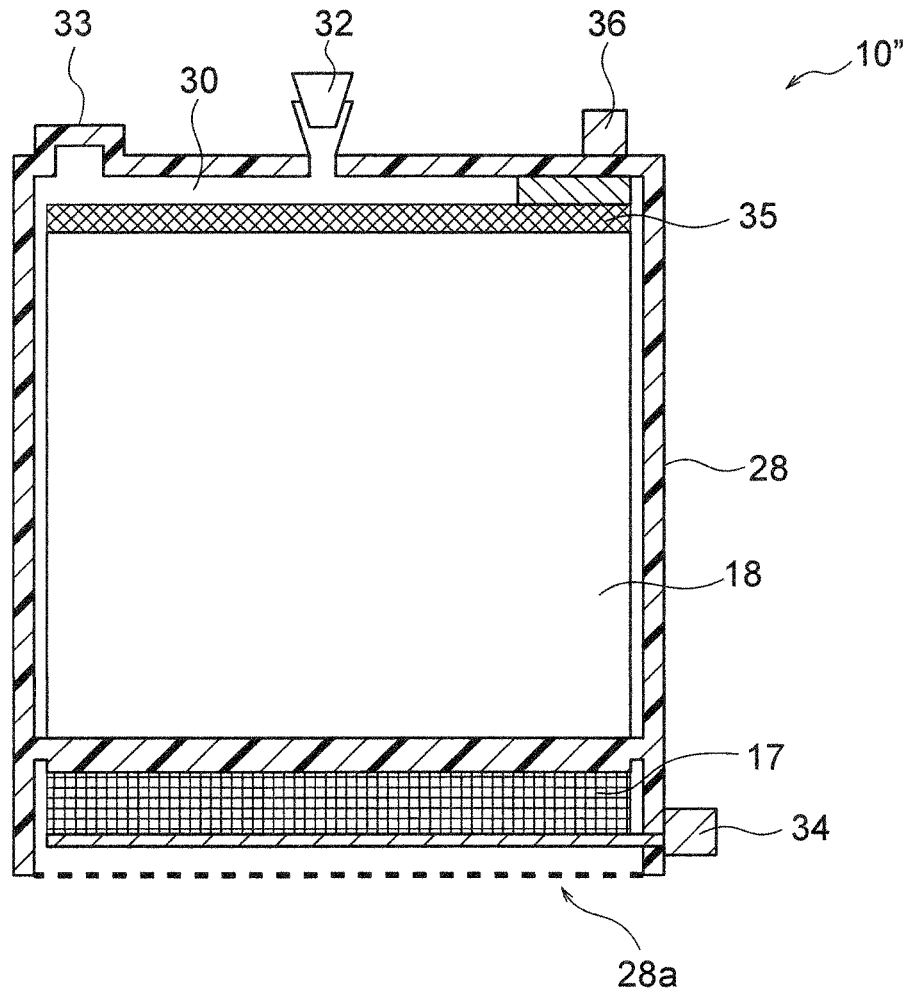
FIG. 3B is a cross-sectional view along the line 3B-3B of the zinc-air secondary battery shown in FIG. 3A.
Figure 3C:
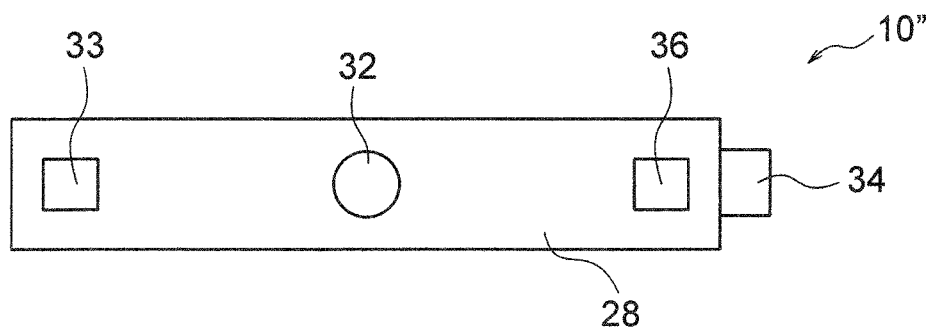
FIG. 3C is a top view of the zinc-air secondary battery shown in FIG. 3A.
Figure 3D:
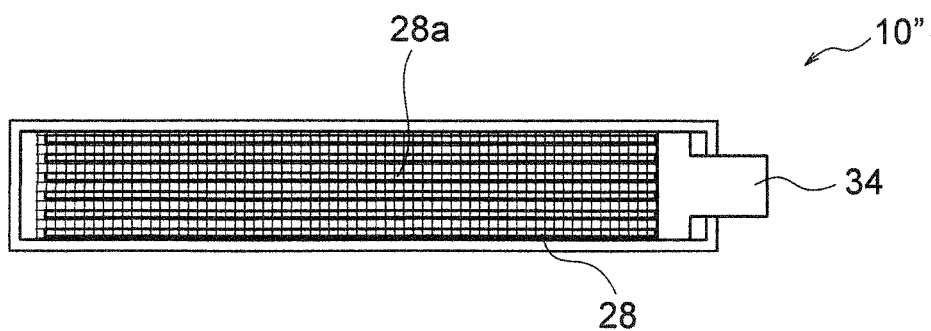
FIG. 3D is a bottom view of the zinc-air secondary battery shown in FIG. 3A.

Air electrode layer 16 is provided so as to cover both sides of rigid porous layer 14 and end faces if desired, and at least one end face of rigid porous layer 14 (for example, the upper end faces in FIGS. 1A to 1C and the lower end faces in FIGS. 3A to 3C to be described later) is not covered with air electrode layer 16 in order to secure a path for taking in an outside air into rigid porous layer 14. Air electrode layer 16 is not particularly limited, and a known configuration generally used for zinc-air secondary batteries can be adopted.

LDH separator 18 is provided so as to cover the outside of air electrode layer 16. LDH separator 18 is a separator containing a layered double hydroxide (LDH) and/or an LDH-like compound (hereinafter collectively referred to as a hydroxide ion conductive layered compound) and is defined as a separator that selectively passes hydroxide ions by solely utilizing hydroxide ion conductivity of the hydroxide ion conductive layered compound. The "LDH-like compound" herein is a hydroxide and/or oxide having a layered crystal structure analogous to LDH but is a compound that may not be called LDH, and it can be said to be an equivalent of LDH. However, according to a broad sense of definition, it can be appreciated that "LDH" encompasses not only LDH but also LDH-like compounds. Such LDH separators can be those known as disclosed in Patent Literatures 1 to 6, and are preferably LDH separators composited with a porous substrates.

Figure 8:
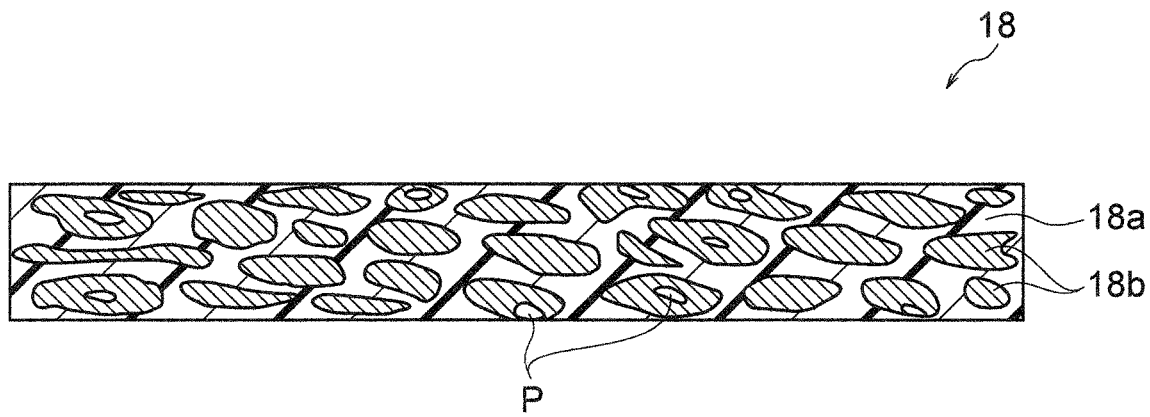
FIG. 8 is a schematic cross-sectional view conceptually illustrating an example of an LDH separator.

A particularly preferable LDH separator 18 contains a porous substrate 18*a* made of a polymer material and a hydroxide ion conductive layered compound 18*b* that clogs up pores P of the porous substrate, as conceptually shown in FIG. 8, and LDH separator 18 of this type will be described later. Porous substrate 18*a* made of a polymer material can be bent even when pressurized and hardly cracks, and accordingly, this is extremely advantageous when it is housed in battery case 28 together with other battery components (negative electrode plate 20, etc.) and pressurized in a direction such that the battery components are adhered to one another, as described above. Moreover, since LDH separator 18 containing porous substrate 18*a* made of a polymer material can have flexibility and a heat fusibility, it can be bent or two or more sheets thereof can be heat-sealed. For example, the outer circumference of rigid porous layer 14 can be enveloped with LDH separator 18 via air electrode layer 16 (see, the outer circumferential portion of rigid porous layer 14 made of metal mesh 14*b* and the outer circumferential portion of rigid porous layer 14 made of porous resin 14*c*, in FIG. 1A.). Alternatively, rigid porous layer 14 can also be sandwiched with LDH separators 18 from both sides thereof via air electrode layer 16, and the overlap of LDH separators 18 at the protruded end portion thereof can be heat-sealed (see, the outer circumferential portion of rigid porous layer 14 made of porous metal 14*a* in FIG. 1A). In any case, by adopting the above configuration, the section including air electrode layer 16 and the section including negative electrode plate 20 can be securely separated with LDH separator 18 interposed therebetween so as to pass selectively hydroxide ions while securing gas impermeability and water impermeability. In view of improving productivity, the following is preferable: air electrode layer 16 is preliminarily formed on LDH separator 18 to form a "separator with an air electrode", and rigid porous layer 14 is enveloped or sandwiched by the separator with the air electrode, thereby to dispose simultaneously air electrode layer 16 and LDH separator 18 on the outer circumference of rigid porous layer 14.

A known configuration as disclosed in Patent Literatures 5 and 6 can be adopted for air electrode layer 16 and LDH separator 18, i.e., the portions of air electrode/separator assembly 12 other than rigid porous layer 14, but preferred air electrode/separator assembly 12 (portion other than the rigid porous layer) will be described later.

Zinc Air Secondary Battery

As shown in FIGS. 1A to 1C, zinc-air secondary battery 10 can be constructed by using air electrode/separator assemblies 12. Zinc-air secondary battery 10 comprises a plurality of air electrode/separator assemblies 12, a plurality of negative electrode plates 20, an electrolyte 26, and a battery case 28. The plurality of air electrode/separator assemblies 12 alternate with the plurality of negative electrode plates 20, thereby forming a stacked-cell battery form suitable for supplying a high voltage or a large current. Negative electrode plate 20 comprises a negative electrode active material layer 22 and a negative electrode current collector 24. Negative electrode active material layer 22 includes at least one selected from the group consisting of zinc, zinc oxide, a zinc alloy and a zinc compound. Electrolyte 26 permeates negative electrode plate 20 and LDH separator 18. In battery case 28, a plurality of air electrode/separator assemblies 12, a plurality of negative electrode plates 20, and electrolyte 26 are vertically housed. The plurality of negative electrode plates 20 and electrolyte 26 are housed in a closed space defined by battery case 28 and the plurality of air electrodes/separator assemblies 12, leaving an upper surplus space 30, and the plurality of air electrode/separator assemblies 12 are allowed to contact an outside air through an opening 28a of battery case 28. Battery case 28 further comprises a pressure release valve 32 that enables release of a gas that can be generated inside the battery, at a position facing or communicating with upper surplus space 30. Since LDH separator 18 has gas impermeability due to its high denseness, it has the problem of preventing a gas from being released to the outside when the gas is suddenly generated inside the battery due to overcharge, etc. However, the configuration of the present embodiment has upper surplus space 30 in the space for housing negative electrode plate 20 in battery case 28, and also has pressure release valve 32, whereby a gas generated inside the battery is allowed to be safely and quickly discharged to the outside of battery case 28, without damaging battery case 28 and the battery components housed therein. Namely, zinc-air secondary battery 10 has an extremely safe configuration. Battery case 28 may have a liquid injection port (not shown) capable of injecting electrolyte 26.

Negative electrode plate 20 comprises a negative electrode active material layer 22 and a negative electrode current collector 24. Negative electrode active material layer 22 includes at least one selected from the group consisting of zinc, zinc oxide, a zinc alloy and a zinc compound. Preferred examples of negative electrode current collector 24 include a copper foil, a copper expanded metal, and a copper punching metal. Electrolyte 26 is preferably an aqueous alkali metal hydroxide solution such as an aqueous solution of potassium hydroxide. Battery case 28 is not particularly limited as long as it has resistance to electrolyte 26 (i.e., alkali resistance), and is preferably made of a resin such as a polyolefin resin, an ABS resin, or a modified polyphenylene ether. Pressure release valve 32 is not particularly limited as long as it has a structure capable of discharging a gas generated inside the battery to the outside of the battery, and a check valve can be used.

FIGS. 1A to 1C show zinc-air secondary battery 10 according to the first preferred embodiment of the present invention. In the present embodiment, the plurality of air electrode/separator assemblies 12 are provided so that the end faces of rigid porous layers 14 not covered with LDH separators 18 face upward. This zinc-air secondary battery 10 has a positive electrode current collecting member 17, a positive electrode current collector terminal 34, negative electrode current collector tabs 25, and a negative electrode current collector terminal 36. Positive electrode current collecting member 17 is connected to the upper ends of the plurality of positive electrode current collectors (corresponding to porous metal 14a, metal mesh 14b, and porous metal layer 15 in the illustrated example) via the end faces of rigid porous layers 14 that are not covered with LDH separators 18. Positive electrode current collector terminal 34 is connected to positive electrode current collecting member 17 and extends from battery case 28. The plurality of negative electrode current collector tabs 25 extend laterally from the lateral end portions of the plurality of negative electrode current collectors 24. Negative electrode current collector terminals 36 is connected to the plurality of negative electrode current collector tabs 25 and extends from battery case 28.

In this way, zinc-air secondary battery 10 of the present embodiment has a configuration in which positive electrode current collection and outside air intake are carried out at the upper portion of the battery and negative electrode current collection is carried out at the lateral end portion, resulting in a space efficient configuration. Therefore, positive electrode current collecting member 17 preferably has a porous structure having air permeability. In this case, positive electrode current collecting member 17 having a porous structure having air permeability and communicating with opening 28a enables to take in an outside air into rigid porous layer 14. Examples of positive electrode current collecting member 17 having a porous structure having air permeability include a metal mesh, a metal non-woven fabric, a punching metal, etc. Above battery case 28, a fan 38 for flowing an air into rigid porous layer 14 via an end face of rigid porous layer 14 not covered with LDH separator 18, is preferably further provided. In such a manner, the positive electrode reaction in air electrode layer 16 can be promoted. Pressure release valve 32 and the liquid injection port (not shown) are preferably disposed on the upper surface or the side surface of battery case 28 (for example, a section communicating with the space where negative electrode current collector tab 25 is present.) in view of space efficiency.

Figure 2A:
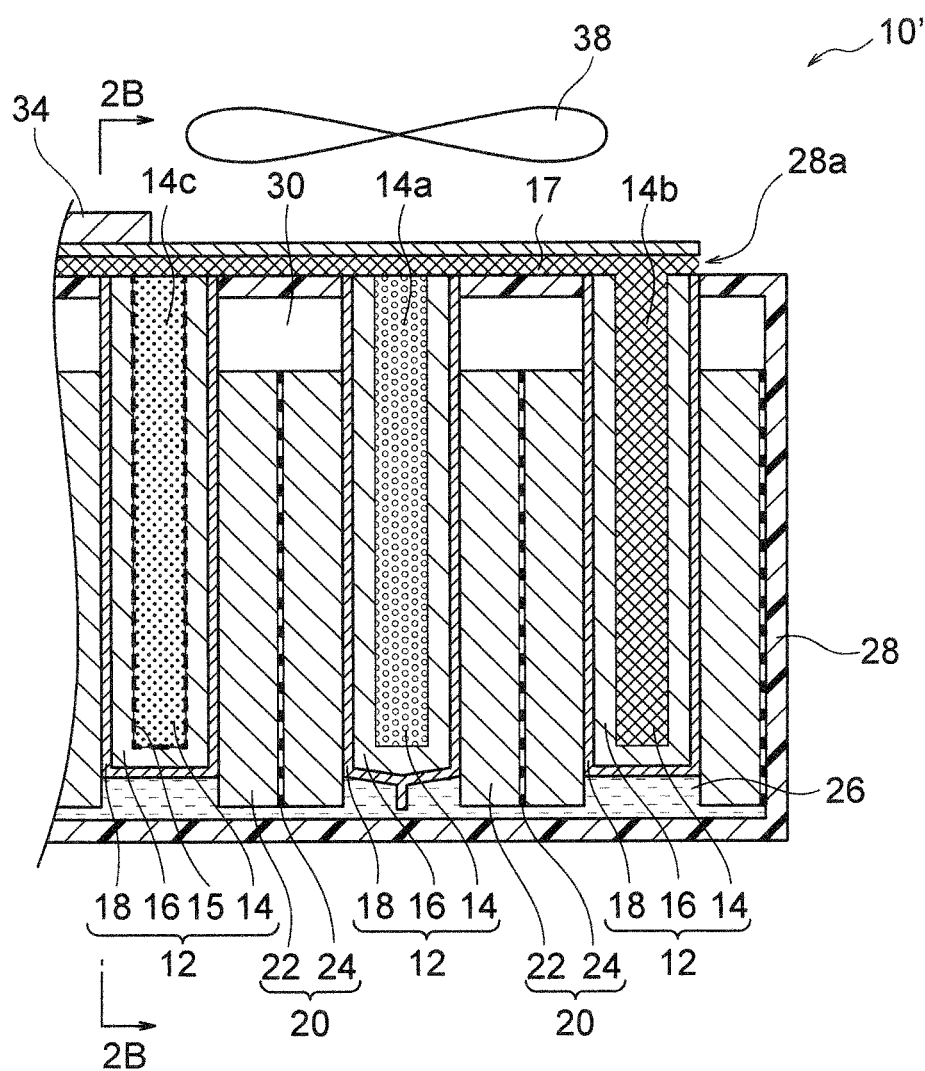
FIG. 2A is a schematic cross-sectional view conceptually illustrating another embodiment (second preferred embodiment) of a zinc-air secondary battery comprising air electrode/separator assemblies according to a plurality of embodiments according to the present invention.
Figure 2B:
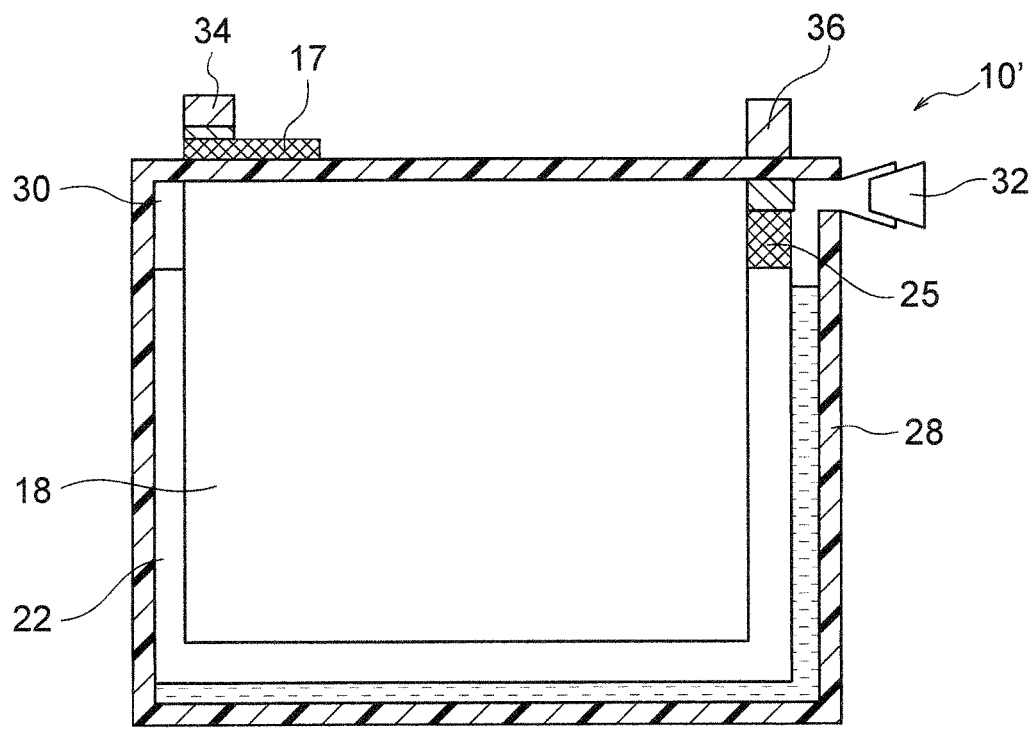
FIG. 2B is a cross-sectional view along the line 2B-2B of the zinc-air secondary battery shown in FIG. 2A.
Figure 2C:
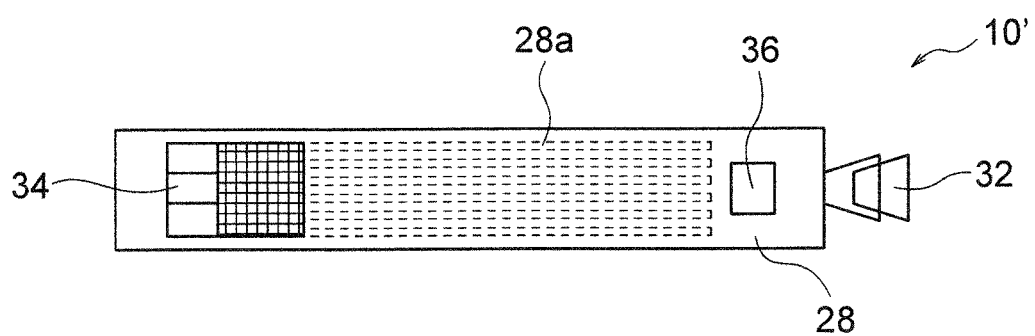
FIG. 2C is a top view of the zinc-air secondary battery shown in FIG. 2A.

FIGS. 2A to 2C show a zinc-air secondary battery 10' according to the second preferred embodiment of the present invention. In the present embodiment, the plurality of air electrode/separator assemblies 12 are provided so that the end faces of rigid porous layers 14 not covered with LDH separators 18 face upward. This zinc-air secondary battery 10' has positive electrode current collecting member 17, positive electrode current collector terminal 34, negative electrode current collector tabs 25, and negative electrode current collector terminal 36. Positive electrode current collecting member 17 is connected to the upper ends of the plurality of positive electrode current collectors (corresponding to porous metal 14a, metal mesh 14b, and porous metal layer 15 in the illustrated example) via the end faces of rigid porous layers 14 that are not covered with LDH separators 18. Positive electrode current collector terminal 34 is connected to positive electrode current collecting member 17 and extends from battery case 28. The plurality of negative electrode current collector tabs 25 extend upward and/or laterally from the upper ends of the plurality of negative electrode current collectors. Negative electrode current collector terminal 36 is connected to the plurality of negative electrode current collector tabs 25 and extends from battery case 28. In zinc-air secondary battery 10' according to the second preferred embodiment, the same components as those of zinc-air secondary battery 10 shown in FIGS. 1A to 1C are designated by the same reference signs, and the description for the components having the same reference signs in zinc-air secondary battery 10 also applies to the second preferred embodiment.

Figure 2D:
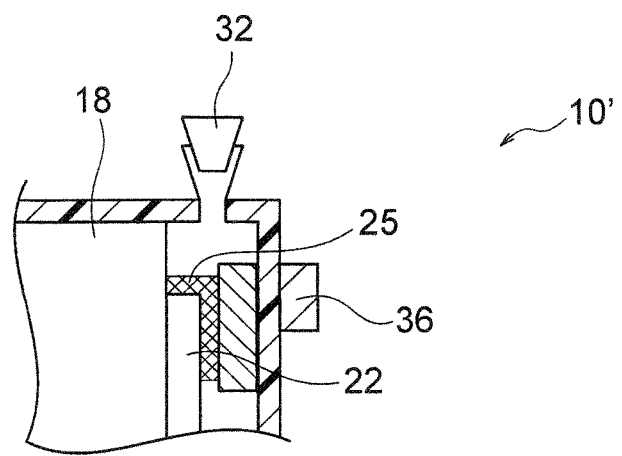
FIG. 2D is a schematic cross-sectional view illustrating a modified example of arrangement of a pressure release valve and a negative electrode current collector terminal in the zinc-air secondary battery shown in FIG. 2A.

In this way, zinc-air secondary battery 10' of the present embodiment has a configuration in which positive electrode current collection, negative electrode current collection, and outside air intake are carried out at the upper portion of the battery, resulting in a space-efficient configuration. However, the negative electrode current collection may be carried out at the lateral end portion as shown in FIG. 2D. In any case, positive electrode current collecting member 17 preferably has a porous structure having air permeability. In this case, positive electrode current collecting member 17 having a porous structure having air permeability and communicating with opening 28a enables to take in the outside air into rigid porous layer 14. Examples of positive electrode current collecting member 17 having a porous structure having air permeability include a metal mesh, a metal non-woven fabric, a punching metal, etc. Above battery case 28, a fan 38 for flowing air into rigid porous layer 14 via the end face of rigid porous layer 14 not covered with LDH separator 18 is preferably further provided. In this way, the positive electrode reaction in air electrode layer 16 can be promoted. As shown in FIG. 2B, pressure release valve 32 and the liquid injection port (not shown) are preferably disposed on the side surface of battery case 28 (for example, a section communicating with the space where negative electrode current collector tab 25 is present), or as shown in FIG. 2D, they are preferably disposed on the upper surface of battery case 28 (for example, a section communicating with the space where negative electrode current collector tab 25 is present), in view of space efficiency.

FIGS. 3A to 3D show a zinc-air secondary battery 10″ according to the third preferred embodiment of the present invention. In the present embodiment, the plurality of air electrode/separator assemblies 12 are provided so that the end faces of rigid porous layers 14 not covered with LDH separators 18 face downward. This zinc-air secondary battery 10″ has positive electrode current collecting member 17, positive electrode current collector terminal 34, a negative electrode current collecting member 35, and negative electrode current collector terminal 36. Positive electrode current collecting member 17 is connected to the lower ends of a plurality of positive electrode current collectors (corresponding to porous metal 14a, metal mesh 14b, and porous metal layer 15 in the illustrated example) via the end faces of rigid porous layers 14 that are not covered with LDH separators 18. Positive electrode current collector terminal 34 is connected to positive electrode current collecting member 17 and extends from battery case 28. Negative electrode current collecting member 35 is provided in upper surplus space 30 and is connected to the upper ends of a plurality of negative electrode current collectors 24. Negative electrode current collector terminal 36 is connected to negative electrode current collecting member 35 and extends from battery case 28. In zinc-air secondary battery 10″ according to the third preferred embodiment, the same components as those of zinc-air secondary battery 10 shown in FIGS. 1A to 1C are designated by the same reference signs, and the description for the components having the same reference signs in zinc-air secondary battery 10 also applies to the third preferred embodiment.

In this way, zinc-air secondary battery 10″ of the present embodiment has a configuration in which negative electrode current collection is carried out at the upper portion of the battery and positive electrode current collection and outside air intake are carried out at the lower portion of the battery, resulting in a space-efficient configuration. Therefore, positive electrode current collecting member 17 preferably has a porous structure having air permeability. Examples of positive electrode current collecting member 17 having a porous structure having air permeability include a metal mesh, a metal non-woven fabric, a punching metal, etc. Below battery case 28, a fan 38 for flowing air into rigid porous layer 14 via the end face of rigid porous layer 14 not covered with LDH separator 18 is preferably further provided. In this way, the positive electrode reaction in air electrode layer 16 can be promoted. Pressure release valve 32 and a liquid injection port 33 are preferably disposed on the upper surface or the side surface of battery case 28 in view of space efficiency. In particular, since the structure for the positive electrode current collection does not exist on the upper portion of the battery in the present embodiment, it has few positional restrictions when pressure release valve 32 and liquid injection port 33 are provided on the upper surface of battery case 28, having high degree of freedom in design.

Figure 4A:
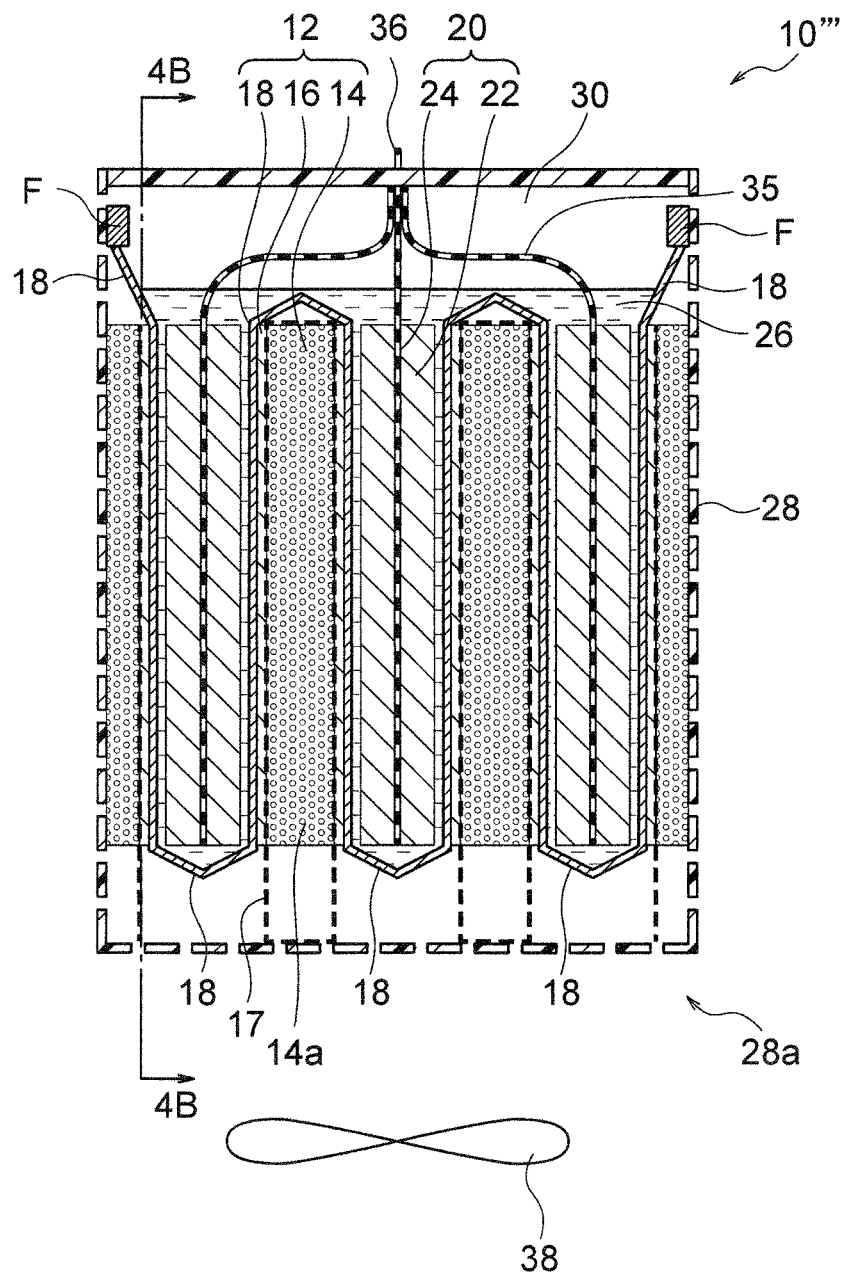
FIG. 4A is a schematic cross-sectional view conceptually illustrating yet another embodiment (fourth preferred embodiment) of a zinc-air secondary battery comprising air electrode/separator assemblies according to one embodiment according to the present invention.
Figure 4B:
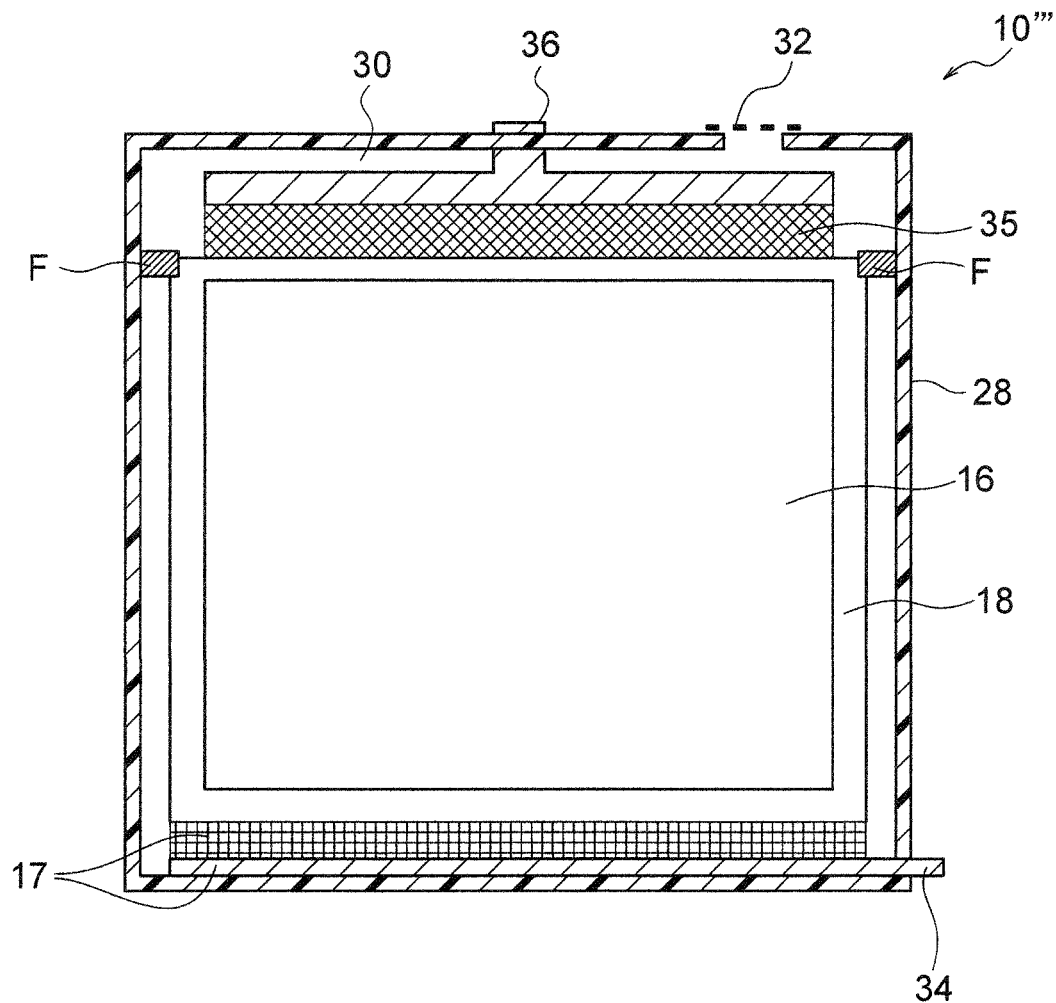
FIG. 4B is a cross-sectional view along the line 4B-4B of the zinc-air secondary battery shown in FIG. 4A.
Figure 4C:
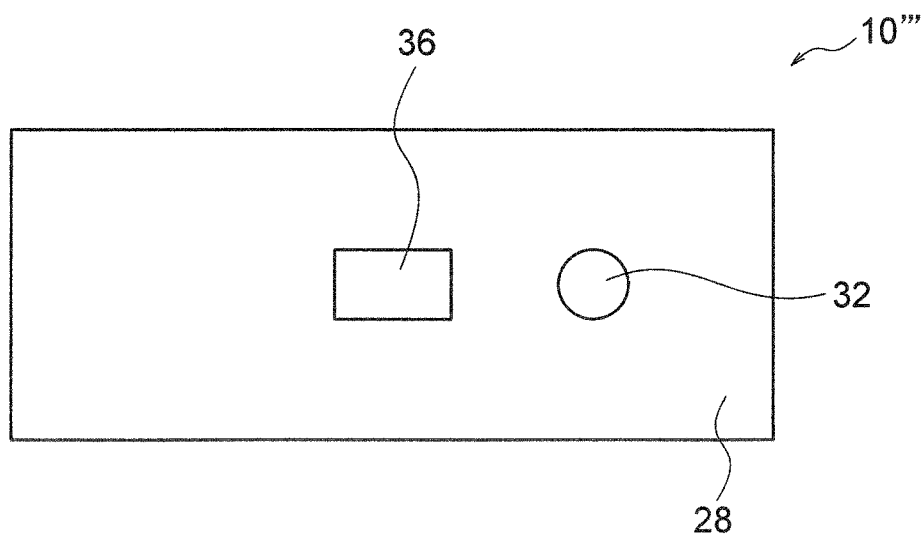
FIG. 4C is a top view of the zinc-air secondary battery shown in FIG. 4A.
Figure 4D:
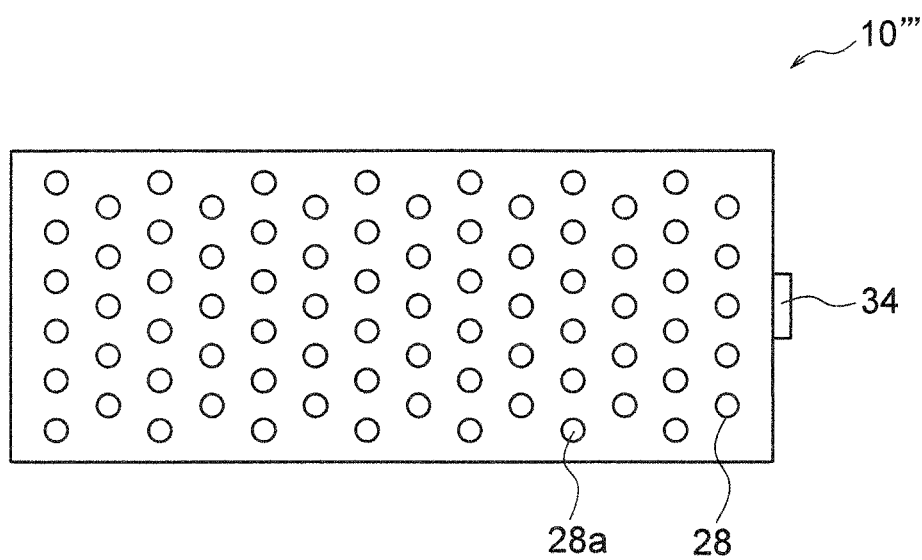
FIG. 4D is a bottom view of the zinc-air secondary battery shown in FIG. 4A.
Figure 4E:
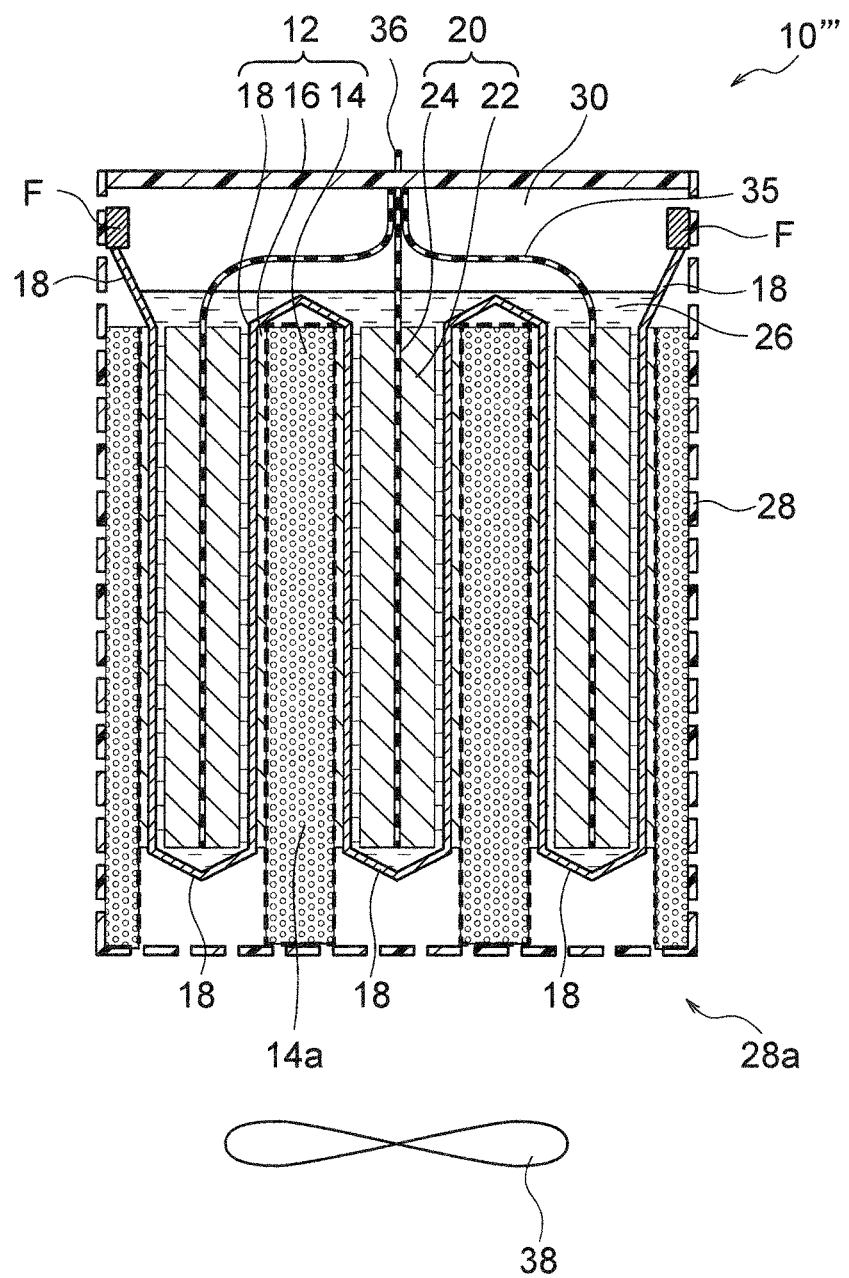
FIG. 4E is a schematic cross-sectional view conceptually illustrating a modified example of the zinc-air secondary battery shown in FIG. 4A.

FIGS. 4A to 4E show a zinc-air secondary battery 10‴ according to the fourth preferred embodiment of the present invention. In the present embodiment, the plurality of air electrode/separator assemblies 12 are provided so that the end faces of rigid porous layers 14 not covered with LDH separators 18 face downward. This zinc-air secondary battery 10‴ has positive electrode current collecting member 17, positive electrode current collector terminal 34, negative electrode current collecting member 35, and negative electrode current collector terminal 36. Positive electrode current collecting member 17 is connected to the lower ends of a plurality of positive electrode current collectors (corresponding to porous metal 14a in the illustrated example) via the end faces of rigid porous layers 14 that are not covered with LDH separators 18. In FIGS. 4A to 4D, the lower end of rigid porous layer 14 is provided so as to float from the bottom surface of battery case 28, which has the advantage of further reducing a battery weight. However, as shown in FIG. 4E, the lower end of rigid porous layer 14 may be provided so as to extend to the bottom surface of battery case 28 or the vicinity thereof, and in this case, there is the advantage of increasing an area of pores of rigid porous layer 14 into which an air can access. Positive electrode current collector terminal 34 is connected to positive electrode current collecting member 17 and extends from battery case 28. Negative electrode current collecting member 35 is provided in upper surplus space 30 and is connected to the upper ends of a plurality of negative electrode current collectors 24. Negative electrode current collector terminal 36 is connected to negative electrode current collecting member 35 and extends from the upper surface of battery case 28. Extending negative electrode current collector terminal 36 from the upper surface of battery case 28 simplifies the structure in upper surplus space 30, resulting ease in collecting current. Negative electrode current collecting member 35 is preferably a negative electrode current collector tab extending upward from the upper ends of the plurality of negative electrode current collectors 24, whereby the plurality of negative electrode current collector tabs can be put together into one and connected to negative electrode current collector terminal 36. LDH separator 18 is configured in a continuous elongated shape such that LDH separator 18 faces each of the plurality of air electrode/separator assemblies 12 and each of the plurality of negative electrode plates 20. The continuous elongated LDH separator 18 may be (i) a single elongated LDH separator, or (ii) one obtained by joining end portions of a plurality of LDH separators adjacent with each other by means of adhesion method such as heat sealing to form into an elongated shape. Elongated LDH separator 18 is formed into a zigzag folded structure. In the case of (ii) above, it is not necessary for the separator to be actually folded, and the joint portion may have a shape like a fold. A laminate of air electrode layer 16 and rigid porous layers 14 (14+16) and negative electrode plate 20 are alternately housed in the plurality of compartments defined by this zigzag folded structure, whereby air electrode layer 16 and negative electrode plate 20 are separated from each other via LDH separator 18. In zinc-air secondary battery 10‴ according to the fourth preferred embodiment, the same components as those of zinc-air secondary battery 10 shown in FIGS. 1A to 1C are designated by the same reference signs, and the description for the components having the same reference signs in zinc-air secondary battery 10 also applies to the fourth preferred embodiment. Moreover, in FIGS. 4A and 4E, rigid porous layer 14 is depicted as porous metal 14a; however, rigid porous layer 14 is not limited thereto, and other forms such as metal mesh 14b and porous resin 14c shown in FIG. 1A, etc., can be taken.

In this way, zinc-air secondary battery 10''' of the present embodiment has a configuration in which negative electrode current collection is carried out at the upper portion of the battery and positive electrode current collection and outside air intake are carried out at the lower portion of the battery, resulting in a space-efficient configuration. Therefore, positive electrode current collecting member 17 preferably has a porous structure having air permeability. Examples of positive electrode current collecting member 17 having a porous structure having air permeability include a metal mesh, a metal non-woven fabric, a punching metal, etc. Below battery case 28, a fan 38 for flowing air into rigid porous layer 14 via the end face of rigid porous layer 14 not covered with LDH separator 18 is preferably further provided. In this way, the positive electrode reaction in air electrode layer 16 can be promoted. Pressure release valve 32 and liquid injection port (not shown) are preferably disposed on the upper surface or the side surface of battery case 28 in view of space efficiency. In particular, since the structure of the positive electrode current collector does not exist on the upper portion of the battery in the present embodiment, it has few positional restrictions when pressure release valve 32 and liquid injection port (not shown) are provided on the upper surface of battery case 28, having high degree of freedom in design.

Moreover, in zinc-air secondary battery 10''' of the present embodiment, elongated LDH separator 18 formed into a zigzag folded structure allows complicated seal and joint between LDH separator 18 and battery case 28 to be unnecessary or minimized, improving the manufacturing efficiency significantly. From this point of view, the lateral ends of the elongated LDH separator 18 that are adjacent to each other with negative electrode plate 20 interposed therebetween, are heat-sealed so as to close the side end of negative electrode plate 20, whereby the negative electrode plate-housing portion of elongated LDH separator 18 forms a baggy structure, into which electrolyte 26 is preferably housed. In this way, a desirable sealing of the baggy structure for housing negative electrode plate 20 and electrolyte 26 is realized, and therefore it is sufficient only to carry out local fixation of a fixing portion F between LDH separator 18 and the inner wall of battery case 28 (for example, by heat sealing), as shown in FIGS. 4A and 4B. Namely, working for sealing a structure can be simplified, which is advantageous. As shown in FIG. 4A, the longitudinal end portion of elongated LDH separator 18 is preferably fixed to the inner wall of battery case 28. Similarly, as shown in FIG. 4B, the lateral end portion of elongated LDH separator 18 is preferably fixed to the inner wall of battery case 28. The end portion of the elongated LDH separator 18 may be fixed to the inner wall of battery case 28 by any method such as heat sealing, adhesive, or other fixing means, but heat sealing is preferred in terms of facilitation of fabrication.

Figure 5A:
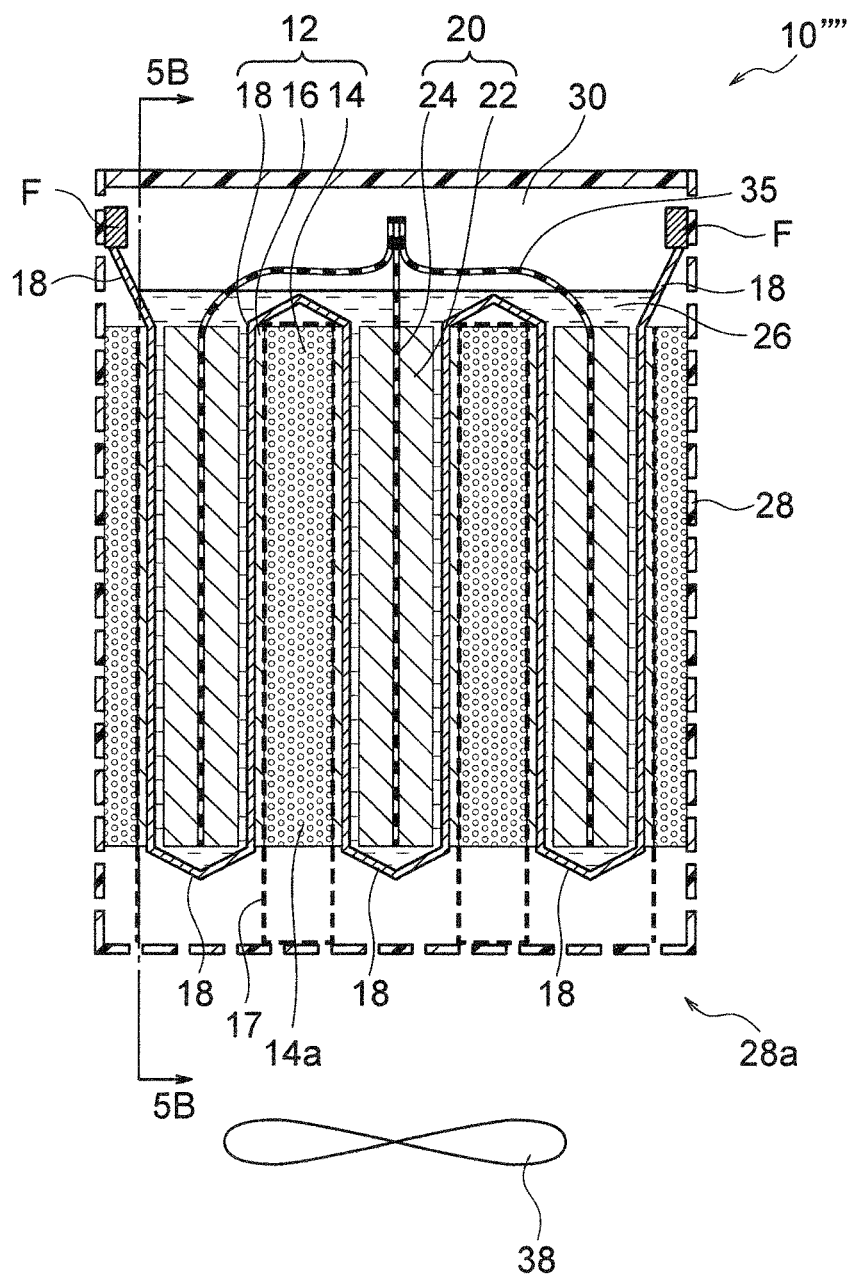
FIG. 5A is a schematic cross-sectional view conceptually illustrating yet another embodiment (fifth preferred embodiment) of a zinc-air secondary battery comprising air electrode/separator assemblies according to one embodiment according to the present invention.
Figure 5B:
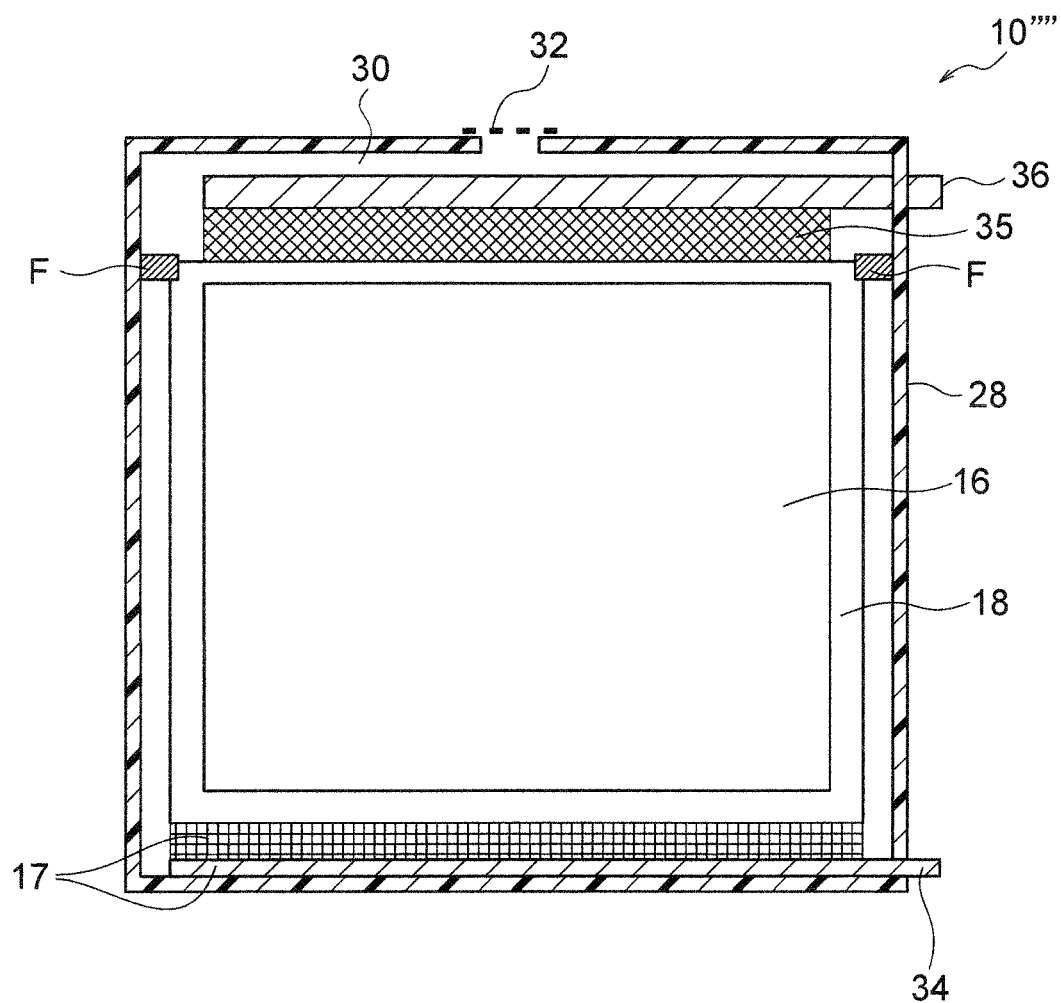
FIG. 5B is a cross-sectional view along the line 5B-5B of the zinc-air secondary battery shown in FIG. 5A.
Figure 5C:
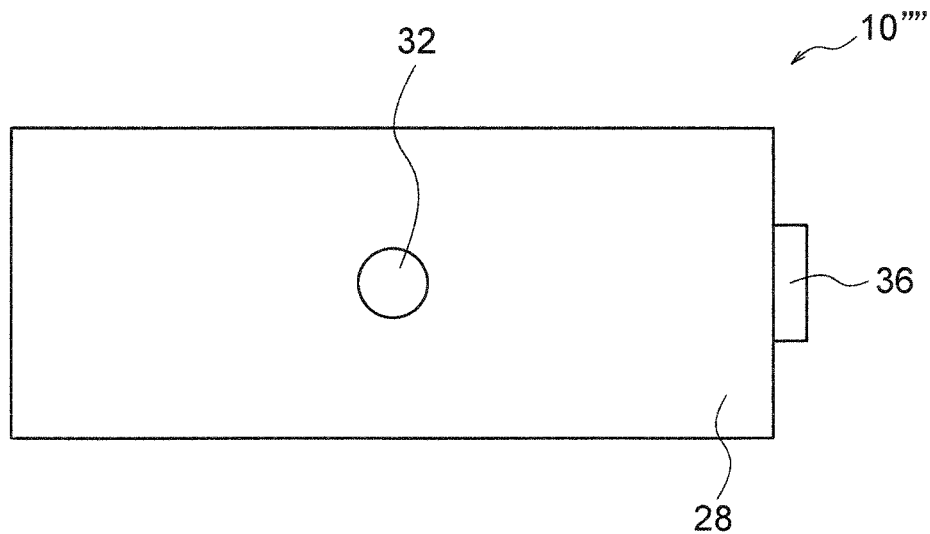
FIG. 5C is a top view of the zinc-air secondary battery shown in FIG. 5A.
Figure 5D:
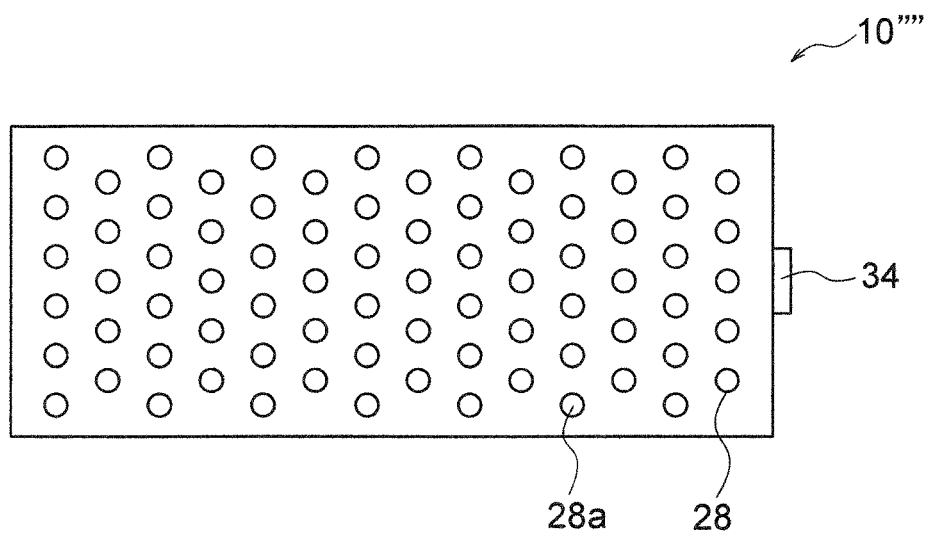
FIG. 5D is a bottom view of the zinc-air secondary battery shown in FIG. 5A.
Figure 5E:
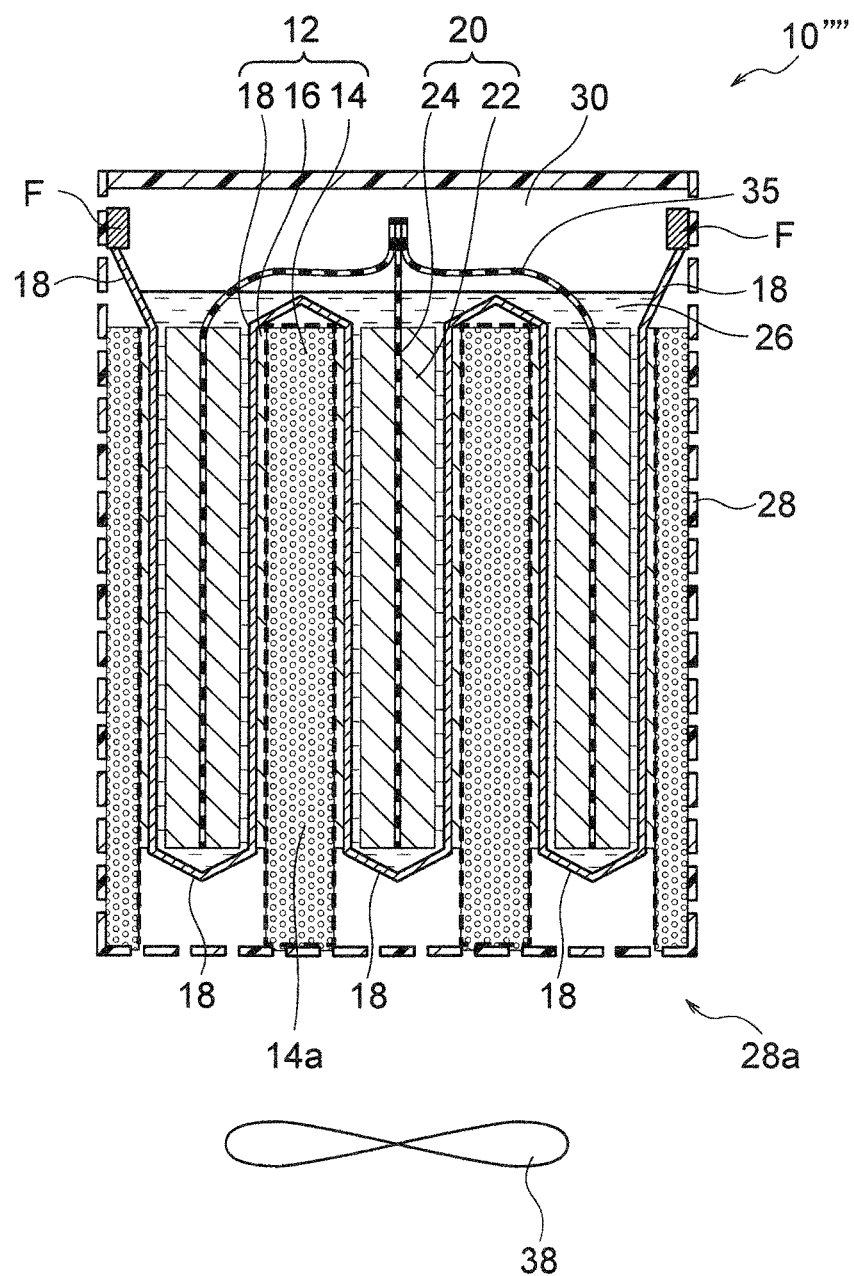
FIG. 5E is a schematic cross-sectional view conceptually illustrating a modified example of the zinc-air secondary battery shown in FIG. 5A.

FIGS. 5A to 5E show a zinc-air secondary battery 10'''' according to the fifth preferred embodiment of the present invention. In the present embodiment, the plurality of air electrode/separator assemblies 12 are provided so that the end faces of rigid porous layers 14 not covered with LDH separators 18 face downward. This zinc-air secondary battery 10'''' has positive electrode current collecting member 17, positive electrode current collector terminal 34, negative electrode current collecting member 35, and negative electrode current collector terminal 36. Positive electrode current collecting member 17 is connected to the lower ends of a plurality of positive electrode current collectors (corresponding to porous metal 14a in the illustrated example) via the end faces of rigid porous layers 14 that are not covered with LDH separators 18. In FIGS. 5A to 5D, the lower end of rigid porous layer 14 is provided so as to float from the bottom surface of battery case 28, which has the advantage of further reducing a battery weight. However, as shown in FIG. 5E, the lower end of rigid porous layer 14 may be provided so as to extend to the bottom surface of battery case 28 or the vicinity thereof, and in this case, there is the advantage of increasing an area of pores of rigid porous layer 14 into which an air can access. Positive electrode current collector terminal 34 is connected to positive electrode current collecting member 17 and extends from battery case 28. Negative electrode current collecting member 35 is provided in upper surplus space 30 and is connected to the upper ends of a plurality of negative electrode current collectors 24. Negative electrode current collector terminal 36 is connected to negative electrode current collecting member 35 and extends from the side surface of battery case 28. Extending negative electrode current collector terminal 36 from the side surface of battery case 28 enables a high degree of freedom in design in the upper surface of battery case 28, and for example, as shown in FIG. 5B, pressure release valve 32 can be provided in the center of the upper surface of battery case 28. Negative electrode current collecting member 35 is preferably a negative electrode current collector tab extending upward from the upper ends of the plurality of negative electrode current collectors 24, whereby the plurality of negative electrode current collector tabs can be put together into one and can be connected to negative electrode current collector terminal 36. LDH separator 18 is configured in a continuous elongated shape such that LDH separator 18 faces each of the plurality of air electrode/separator assemblies 12 and each of the plurality of negative electrode plates 20. The continuous elongated LDH separator 18 may be (i) a single elongated LDH separator, or (ii) one obtained by joining end portions of a plurality of LDH separators adjacent with each other by means of adhesion method such as heat sealing to form into an elongated shape. Elongated LDH separator 18 is formed into a zigzag folded structure. In the case of (ii) above, it is not necessary for the separator to be actually folded, and the joint portion may have a shape like a fold. An laminate of air electrode layer 16 and rigid porous layers 14 (14+16) and negative electrode plate 20 are alternately housed in the plurality of compartments defined by this zigzag folded structure, whereby air electrode layer 16 and negative electrode plate 20 are separated from each other via LDH separator 18. In zinc-air secondary battery 10'''' according to the fifth preferred embodiment, the same components as those of zinc-air secondary battery 10 shown in FIGS. 1A to 1C are designated by the same reference signs, and the description for the components having the same reference signs in zinc-air secondary battery 10 also applies to the fifth preferred embodiment. Moreover, in FIGS. 5A and 5E, rigid porous layer 14 is depicted as porous metal 14a; however, rigid porous layer 14 is not limited thereto, and other forms such as metal mesh 14b and porous resin 14c shown in FIG. 1A, etc., can be taken.

In this way, zinc-air secondary battery 10'''' of the present embodiment has a configuration in which negative electrode current collection is carried out at the upper portion of the battery and positive electrode current collection and outside air intake are carried out at the lower portion of the battery, resulting in a space-efficient configuration. Therefore, positive electrode current collecting member 17 preferably has a porous structure having air permeability. Examples of positive electrode current collecting member 17 having a porous structure having air permeability include a metal mesh, a metal non-woven fabric, a punching metal, etc. Below battery case 28, a fan 38 for flowing air into rigid porous layer 14 via the end face of rigid porous layer 14 not covered with LDH separator 18 is preferably further provided. In this way, the positive electrode reaction in air electrode layer 16 can be promoted. Pressure release valve 32 and liquid injection port (not shown) are preferably disposed on the upper surface or the side surface of battery case 28 in view of space efficiency. In particular, since the structure of the positive electrode current collector does not exist on the upper portion of the battery in the present embodiment, it has few positional restrictions when pressure release valve 32 and liquid injection port (not shown) are provided on the upper surface of battery case 28, having high degree of freedom in design.

Moreover, in zinc-air secondary battery 10" of the present embodiment, elongated LDH separator 18 formed into a zigzag folded structure allows complicated seal and joint between LDH separator 18 and battery case 28 to be unnecessary or minimized, improving the manufacturing efficiency significantly. From this point of view, the lateral ends of the elongated LDH separator 18, which are adjacent to each other with negative electrode plate 20 interposed therebetween, are heat-sealed so as to close the side end of negative electrode plate 20, whereby the negative electrode plate-housing portion of elongated LDH separator 18 forms a baggy structure, into which electrolyte 26 is preferably housed. In this way, a desirable sealing of the baggy structure housing negative electrode plate 20 and electrolyte 26 is realized, and therefore it is sufficient only to carry out local fixation of a fixing portion F between LDH separator 18 and the inner wall of battery case 28 (for example, by heat sealing), as shown in FIGS. 5A and 5B. Namely, working for sealing a structure can be simplified, which is advantageous. As shown in FIG. 5A, the longitudinal end portion of the elongated LDH separator 18 is preferably fixed to the inner wall of battery case 28. Similarly, as shown in FIG. 5B, the lateral end portion of elongated LDH separator 18 is preferably fixed to the inner wall of battery case 28. The end portion of elongated LDH separator 18 may be fixed to the inner wall of battery case 28 by any method such as heat sealing, adhesive, or other fixing means, but heat sealing is preferred in terms of facilitation of fabrication.

As described above, in any of the first, second, third, fourth and fifth preferred embodiments described above, preferably the plurality of air electrode/separator assemblies 12 and the plurality of negative electrode plates 20 are laterally packed without any gap in battery case 28 and compressed by the inner wall of battery case 28 in the thickness direction of the air electrode/separator assembly 12 and negative electrode plate 20. In this way, the gap between negative electrode plate 20 and LDH separator 18 that allows the growth of zinc dendrite, is minimized (preferably eliminated), which expectedly prevents zinc dendrite extension more effectively.

Air Electrode/Separator Assembly (Portion Other than Rigid Porous Layer)

Figure 9:
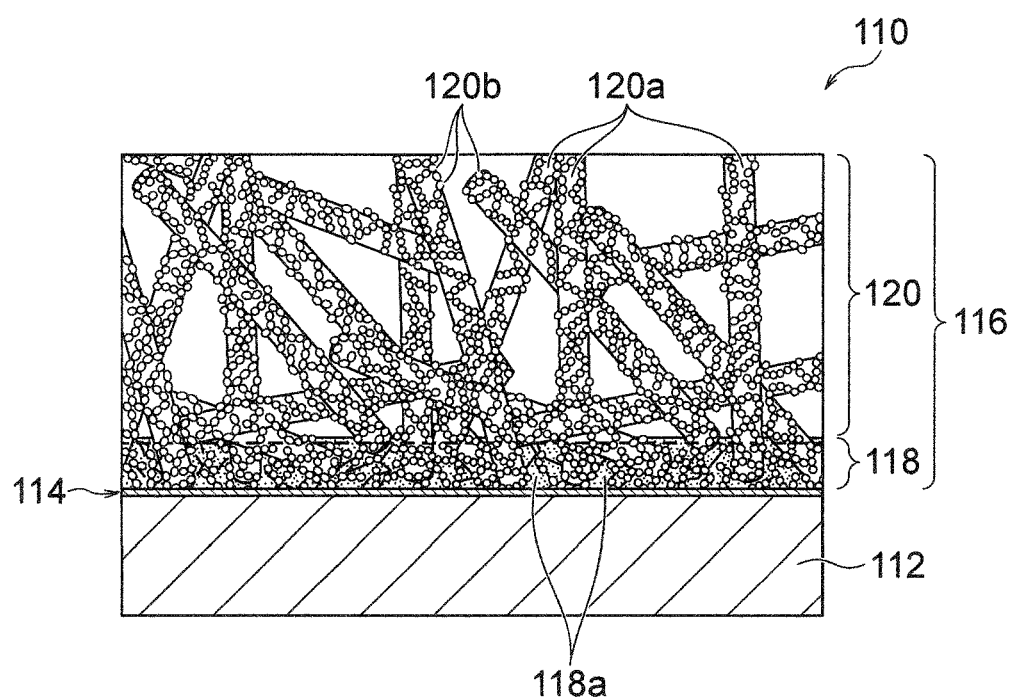
FIG. 9 is a schematic cross-sectional view conceptually illustrating a preferred embodiment of an air electrode/separator assembly (a portion other than a rigid porous layer).

FIG. 9 shows a preferred example of a portion other than the rigid porous layer of an air electrode/separator assembly including the LDH separator. An air electrode/separator assembly 110 shown in FIG. 9 comprises an LDH separator 112 and an air electrode layer 116. An interface layer 114 is preferably provided between LDH separator 112 and air electrode layer 116, and interface layer 114 contains a hydroxide ion conductive material and an electron conductive material. However, interface layer 114 may be omitted as long as desired bonding with low resistance between LDH separator 112 and air electrode layer 116 can be realized. Air electrode layer 116 comprises at least an outermost catalyst layer 120. Air electrode layer 116 preferably has an internal catalyst layer 118 between interface layer 114 and outermost catalyst layer 120, but internal catalyst layer 118 may not be provided as in the case of air electrode/separator assembly 110' shown in FIG. 10. Outermost catalyst layer 120 is composed of a porous current collector 120a and an LDH 120b that covers the surface thereof. The hydroxide ion conductive material contained in interface layer 114 has the form of a plurality of platy particles, and preferably the plurality of platy particles 113 are vertically or obliquely bonded to the main surface of LDH separator 112 as conceptually shown in FIG. 11. According to such a configuration, even when the electrolyte is not present in air electrode layer 116, a metal-air secondary battery including the resulting assembly can exhibit excellent charge/discharge performance.

Namely, as described above, the metal-air secondary battery including the LDH separator has an excellent advantage of being capable of preventing both the short circuit between the positive and negative electrodes due to the metal dendrite and the inclusion of carbon dioxide. Moreover, it also has an advantage of inhibiting evaporation of water contained in the electrolyte due to the denseness of the LDH separator. However, since the LDH separator blocks the permeation of the electrolyte into the air electrode, the electrolyte is absent in the air electrode layer, and therefore the hydroxide ion conductivity tends to be low, compared with a zinc-air secondary battery including a general separator (for example, a porous polymer separator) that allows permeation of an electrolyte into an air electrode, leading to a decrease in charge/discharge performance. In this respect, such a problem is conveniently solved according to air electrode/separator assembly 110.

The details of the mechanism are not necessarily clear, but it is surmised as follows. Since outermost catalyst layer 120 contains porous current collector 120a, it can function as a layer for current collection and gas diffusion as a gas diffusion electrode, and covering the surface of porous current collector 120a with LDH 120b allows the layer to have both catalytic performance and hydroxide ion conductivity in addition to the above functions, resulting in that a larger reactive region can be secured. This is because LDH 120b, i.e., the layered double hydroxide, is a hydroxide ion conductive material and can have a function as an air electrode catalyst as well. In this way, the three-phase interface composed of the ion conductive phase (LDH 120b), the electron conductive phase (porous current collector 120a), and the gas phase (air), is present over the entire outermost catalyst layer 120, and therefore, the three-phase interface is present not only in the interface (interface layer 114) between LDH separator 112 and air electrode layer 116, but also in air electrode layer 116. Thus, it is surmised that hydroxide ions that contribute to the battery reaction effectively transfer in a wider surface area (i.e., the reaction resistance is lowered). Moreover, interface layer 114 contains the hydroxide ion conductive material and the electron conductive material, and platy particles 113 of the hydroxide ion conductive material contained in interface layer 114 are vertically to obliquely bonded on the main surface of LDH separator. It is surmised that these allows hydroxide ions to smoothly transfer between air electrode layer 116 and LDH separator 112 (i.e., the reaction resistance is lowered). In particular, it is surmised that platy particles 113 being vertically or obliquely bonded to the main surface of the LDH separator reduce interfacial resistance between air electrode layer 116 and LDH separator 112 since platy particle 113 of the hydroxide ion conductive material such as LDH has a property of conducting hydroxide ions in the plate surface direction (surface direction (003) in the case of LDH). It is surmised that by conveniently combining the various functions of interface layer 114 and outermost catalyst layer 120 in such a way, excellent charge/discharge performance can be realized while having the advantage of using LDH separator 112.

Figure 11:
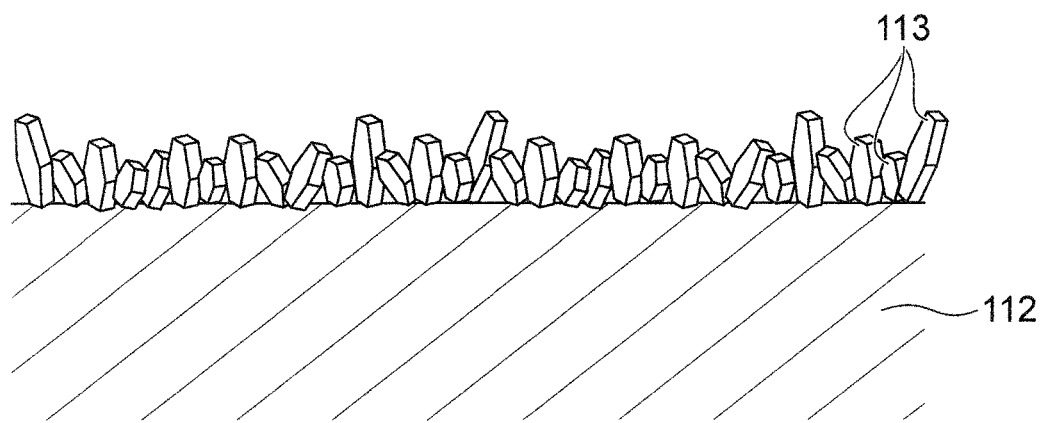
FIG. 11 is a schematic cross-sectional view conceptually illustrating one example of platy particles vertically or obliquely bonded on the surface of an LDH separator.

Interface layer 114 contains the hydroxide ion conductive material and the electron conductive material. The hydroxide ion conductive material contained in interface layer 114 has the form of a plurality of platy particles 113, and the plurality of platy particles 113 are vertically or obliquely bonded to the main surface of LDH separator 112 as conceptually shown in FIG. 11. The hydroxide ion conductive material contained in interface layer 114 is not particularly limited as long as it has hydroxide ion conductivity and has the form of a platy particulate, but is preferably an LDH and/or LDH-like compound. In particular, when observing the microstructure of the surface of LDH separator 112 fabricated according to a known method, LDH platy particles 113 are typically bonded vertically or obliquely to the main surface of LDH separator 112, as shown in FIG. 11, and in the present invention, the interfacial resistance is significantly reduced by the presence of the platy particles (hydroxide ion conductive material) in such an oriented state and the electron conductive material between LDH separator 112 and air electrode layer 116. Therefore, by adopting a material of the same type as LDH and/or LDH-like compound contained in LDH separator 112 as the hydroxide ion conductive material contained in interface layer 114, LDH platy particles 113 for constituting interface layer 114 can be provided when fabricating LDH separator 112. On the other hand, the electron conductive material contained in interface layer 114 preferably contains a carbon material. Preferred examples of the carbon material include, but are not limited to, carbon black, graphite, carbon nanotubes, graphene, reduced graphene oxide, and any combination thereof, and various other carbon materials can also be used. Interface layer 114 may be fabricated by coating the surface of LDH separator 112 on which platy particles 113 are vertically or obliquely bonded, with a slurry or solution containing a carbon material (for example, carbon ink such as graphene ink). Alternatively, when providing internal catalyst layer 118, internal catalyst layer 118 and LDH separator 112 may be adhered to each other so that platy particles 113 on the surface of LDH separator 112 encroach into internal catalyst layer 118 to fabricate interface layer 114, and in this case, the portion where platy particles 113 encroach into internal catalyst layer 118 serves as interface layer 114.

Outermost catalyst layer 120 contained in air electrode layer 116 is composed of a porous current collector 120a and an LDH 120b covering the surface thereof. Porous current collector 120a is not particularly limited as long as it is composed of an electron conductive material having gas diffusivity, but porous current collector 120a is preferably composed of at least one selected from the group consisting of carbon, nickel, stainless steel, and titanium, and more preferably carbon. Specific examples of porous current collector 120a include carbon paper, nickel foam, stainless nonwoven fabric, and any combination thereof, and carbon paper is preferred. A commercially available porous material can be used as the current collector. In view of securing a wide reaction region, i.e., a wide three-phase interface composed of the ion conduction phase (LDH 120b), the electron conduction phase (porous current collector 120a), and the gas phase (air), the thickness of porous current collector 120a is preferably 0.1 to 1 mm, more preferably 0.1 to 0.5 mm, and still more preferably 0.1 to 0.3 mm. The porosity of outermost catalyst layer 120 is preferably 70% or more, more preferably 70 to 95%. Particularly in the case of carbon paper, it is still more preferably 70 to 90%, and particularly preferably 75 to 85%. The porosity values described above enable securing both excellent gas diffusibility and a wide reaction region. Moreover, the generated water is less likely to clog up pores due to the large pore spaces. The porosity can be measured by a mercury intrusion method.

LDH 120b contained in outermost catalyst layer 120 is known to have at least one of the properties of catalytic performance and hydroxide ion conductivity. Therefore, the composition of LDH 120b is not particularly limited, but preferably has a basic composition represented by the formula: $M^{2+}_{1-x}M^{3+}_{x}(OH)_2A^{n-}_{x/n} \cdot mH_2O$, wherein $M^{2+}$ is at least one divalent cation, and $M^{3+}$ is at least one trivalent cation, $A^{n-}$ is an n-valent anion, n is an integer of 1 or more, x is 0.1 to 0.4, and m is an arbitrary real number. In the above formula, $M^{2+}$ can be an arbitrary divalent cation, and preferred examples thereof include $Ni^{2+}$, $Mg^{2+}$, $Ca^{2+}$, $Mn^{2+}$, $Fe^{2+}$, $Co^{2+}$, $Cu^{2+}$, and $Zn^{2+}$. $M^{3+}$ can be an arbitrary trivalent cation, and preferred examples thereof include $Fe^{3+}$, $V^{3+}$, $Al^{3+}$, $Co^{3+}$, $Cr^{3+}$, and $In^{3+}$. In particular, in order for LDH 120b to have both catalytic performance and hydroxide ion conductivity, $M^{2+}$ and $M^{3+}$ each are desirably a transition metal ion. From this viewpoint, more preferred $M^{2+}$ is a divalent transition metal ion such as $Ni^{2+}$, $Mn^{2+}$, $Fe^{2+}$, $Co^{2+}$, and $Cu^{2+}$, and particularly preferably $Ni^{2+}$, and more preferred $M^{3+}$ is a trivalent transition metal ion such as $Fe^{3+}$, $V^{3+}$, $Co^{3+}$, and $Cr^{3+}$, and particularly preferably $Fe^{3+}$, $V^{3+}$, and/or $Co^{3+}$. In this case, some of $M^{2+}$ may be replaced with a metal ion other than the transition metal, such as $Mg^{2+}$, $Ca^{2+}$, and $Zn^{2+}$, and some of $M^{3+}$ may be replaced with a metal ion other than the transition metal, such as $Al^{3+}$ and $In^{3+}$. $A^{n-}$ can be an arbitrary anion. Preferred examples thereof include $NO_3^-$, $CO_3^{2-}$, $SO_4^{2-}$, $OH^-$, $Cl^-$, $I^-$, $Br^-$, and $F^-$, and it is more preferably $NO_3^-$ and/or $CO_3^{2-}$. Therefore, in the above formula it is preferred that $M^{2+}$ include $Ni^{2+}$, $M^{3+}$ include $Fe^{3+}$, and $A^{n-}$ include $NO_3^-$ and/or $CO_3^{2-}$. n is an integer of 1 or more, and preferably 1 to 3. x is 0.1 to 0.4, and preferably 0.2 to 0.35. m is an arbitrary real number and more specifically greater than or equal to 0, typically a real number or an integer greater than 0 or greater than or equal to 1.

LDH 120b has a form of a plurality of LDH platy particles, and the plurality of LDH platy particles are preferably bonded vertically or obliquely to the surface of the porous current collector. The plurality of LDH platy particles are preferably connected to one another in outermost catalyst layer 120. Such a configuration can reduce the reaction resistance. Such a configuration can be realized by immersing porous current collector 120a in the LDH raw material solution and hydrothermally synthesizing the LDH particles by a known method.

LDH 120b may be a mixture of two or more types of LDHs having different compositions. In this case, the particle diameter distributions of the two or more types of LDH particles preferably differ from one another in view of securing the strength for being supported on the substrate. It is preferred that the LDH platy particles having the larger average particle diameters be vertical or oblique to the surface of porous current collector 120a, in terms of promoting diffusion of oxygen into porous current collector 120a and securing a large amount of LHD supported.

In outermost catalyst layer 120, LDH 120b functions as the air electrode catalyst and/or the hydroxide ion conductive material, and outermost catalyst layer 120 may further contain an air electrode catalyst and/or a hydroxide ion conductive material in addition to LDH 120b. Examples of catalysts other than LDH include metal oxides, metal nanoparticles, carbon materials, and any combination thereof. A material capable of adjusting a water content is also preferably present in outermost catalyst layer 120. In this respect, LDH 120b itself functions as a material capable of adjusting a water content, and other examples include zeolite, calcium hydroxide, and combination thereof.

The method for producing outermost catalyst layer 120 is not particularly limited, and the production thereof may be carried out by hydrothermally synthesizing LDH 120b to deposit it on the surface of porous current collector 120a, by a known method. For example, (1) porous current collector 120a is provided, (2) porous current collector 120a is coated with an iron oxide solution and dried to form an iron oxide layer, (3) the porous substrate is immersed in a raw material aqueous solution containing nickel ions ($Ni^{2+}$) and urea, and (4) the porous substrate is hydrothermally treated in the raw material aqueous solution to form LDH 120b (Ni—Fe-LDH in this case) on the surface of porous current collector 120a. Thus, outermost catalyst layer 120 can be produced.

Preferably air electrode layer 116 further has an internal catalyst layer 118 between outermost catalyst layer 120 and interface layer 114. In this case, internal catalyst layer 118 is preferably filled with a mixture 118a containing a hydroxide ion conductive material, an electron conductive material, an organic polymer, and an air electrode catalyst. The hydroxide ion conductive material may be the same material as the air electrode catalyst, and examples of such a material include a LDH containing a transition metal (for example, Ni—Fe-LDH, Co—Fe-LDH, and Ni—Fe—V-LDH). On the other hand, examples of the hydroxide ion conductive material which does not serve as the air electrode catalyst include Mg—Al-LDH. The electron conductive material may be the same material as the air electrode catalyst, and examples of such a material include carbon materials, metal nanoparticles, nitrides such as TiN, and $LaSr_3Fe_3O_{10}$.

The hydroxide ion conductive material contained in internal catalyst layer 118 is not particularly limited as long as the material has a hydroxide ion conductivity, and it is preferably LDH and/or LDH-like compounds. The composition of LDH is not particularly limited, and preferably has a basic composition represented by the formula: $M^{2+}_{1-x}M^{3+}_x(OH)_2 A^{n-}_{x/n}\cdot mH_2O$, wherein $M^{2+}$ is at least one divalent cation, $M^{3+}$ is at least one trivalent cation, $A^{n-}$ is an n-valent anion, n is an integer of 1 or more, x is 0.1 to 0.4, and m is an arbitrary real number. In the above formula, $M^{2+}$ can be an arbitrary divalent cation, and preferred examples thereof include $Ni^{2+}$, $Mg^{2+}$, $Ca^{2+}$, $Mn^{2+}$, $Fe^{2+}$, $Co^{2+}$, $Cu^{2+}$, and $Zn^{2+}$. $M^{3+}$ can be an arbitrary trivalent cation, and preferred examples thereof include $Fe^{3+}$, $V^{3+}$, $Al^{3+}$, $Co^{3+}$, $Cr^{3+}$, and $In^{3+}$. In particular, in order for LDH to have both catalytic performance and hydroxide ion conductivity, $M^{2+}$ and $M^{3+}$ each are desirably a transition metal ions. From this viewpoint, more preferred $M^{2+}$ is a divalent transition metal ion such as $Ni^{2+}$, $Mn^{2+}$, $Fe^{2+}$, $Co^{2+}$, and $Cu^{2+}$, and particularly preferably $Ni^{2+}$, and more preferred $M^{3+}$ is a trivalent transition metal ion such as $Fe^{3+}$, $V^{3+}$, $Co^{3+}$, and $Cr^{3+}$, and particularly preferably $Fe^{3+}$, $V^{3+}$, and/or $Co^{3+}$. In this case, some of $M^{2+}$ may be replaced with a metal ion other than the transition metal, such as $Mg^{2+}$, $Ca^{2+}$, and $Zn^{2+}$, and some of $M^{3+}$ may be replaced with a metal ion other than the transition metal, such as $Al^{3+}$ and $In^{3+}$. $A^{n-}$ can be an arbitrary anion. Preferred examples thereof include $NO_3^-$, $CO_3^{2-}$, $SO_4^{2-}$, $OH^-$, $Cl^-$, $I^-$, $Br^-$, and $F^-$, and it is more preferably $NO_3^-$ and/or $CO_3^{2-}$. Therefore, in the above formula, it is preferred that $M^{2+}$ include $Ni^{2+}$, $M^{3+}$ include $Fe^{3+}$, and $A^{n-}$ include $NO_3^-$ and/or $CO_3^{2-}$. n is an integer of 1 or more, and preferably 1 to 3. x is 0.1 to 0.4 and preferably 0.2 to 0.35. m is an arbitrary real number and more specifically greater than or equal to 0, typically a real number or an integer greater than 0 or greater than or equal to 1.

The electron conductive material contained in internal catalyst layer 118 is preferably at least one selected from the group consisting of electrically conductive ceramics and carbon materials. In particular, examples of the electrically conductive ceramics include $LaNiO_3$ and $LaSr_3Fe_3O_{10}$. Examples of carbon materials include, but are not limited to, carbon black, graphite, carbon nanotubes, graphene, reduced graphene oxide, and any combination thereof, and various other carbon materials can also be used.

The air electrode catalyst contained in internal catalyst layer 118 is preferably at least one selected from the group consisting of LDH and other metal hydroxides, metal oxides, metal nanoparticles, and carbon materials, and more preferably at least one selected from the group consisting of LDH, metal oxides, metal nanoparticles, and carbon materials. LDH is as described above for the hydroxide ion conductive material, which is particularly preferable in terms of performing both the functions of the air electrode catalyst and the hydroxide ion conductive material. Examples of the metal hydroxide include Ni—Fe—OH, Ni—Co—OH and any combination thereof, which may further contain a third metal element. Examples of the metal oxide include $Co_3O_4$, $LaNiO_3$, $LaSr_3Fe_3O_{10}$, and any combination thereof. Examples of the metal nanoparticle (typically metal particle having a particle diameter of 2 to 30 nm) include Pt, Ni—Fe alloy. Examples of the carbon material include, but are not limited to, carbon black, graphite, carbon nanotubes, graphene, reduced graphene oxide, and any combination thereof, as described above, and various other carbon materials can also be used. Preferably the carbon material further contains a metal element and/or other elements such as nitrogen, boron, phosphorus, and sulfur, in view of improving the catalytic performance of the carbon material.

A known binder resin can be used as the organic polymer contained in internal catalyst layer 118. Examples of the organic polymer include a butyral-based resin, vinyl alcohol-based resin, celluloses, vinyl acetal-based resin, and fluorine-based resin, and the butyral-based resin and fluorine-based resin are preferable.

Internal catalyst layer 118 is desired to have a lower porosity than outermost catalyst layer 120 in order to efficiently transfer hydroxide ions to and from LDH separator 112. Specifically, the porosity of internal catalyst layer 118 is preferably 30 to 60%, more preferably 35 to 60%, and still more preferably 40 to 55%. For the same reason, the average pore diameter of the internal catalyst layer is preferably 5 μm or less, more preferably 0.5 to 4 μm, and still more preferably 1 to 3 μm. The measurements of the porosity and the average pore diameter of internal catalyst layer 118 can be carried out by a) polishing the cross section of the LDH separator with a cross section polisher (CP), b) using an SEM (scanning electron microscope) at a magnification of 10,000× to acquire images of two fields of vision of the cross-section of the internal catalyst layer, c) binarizing each image by using an image analysis software (for example, Image-J) based on the image data of the acquired cross-sectional image, and d) determining the area of each pore for two fields of vison, calculating the porosity values and the pore diameter values of pores, and taking the average value thereof as the porosity and the average pore diameter of the internal catalyst layer. The pore diameter can be calculated by converting the length per pixel of the image from the actual size, dividing the area of each pore obtained from the image analysis by pi, on the assumption that each pore is a perfect circle, and multiplying the square root of the quotient by 2 to obtain the average pore diameter. The porosity can be calculated by dividing the number of pixels corresponding to pores by the number of pixels in the total area and multiplying the quotient by 100.

Internal catalyst layer 118 can be fabricated by preparing a paste containing the hydroxide ion conductive material, the electron conductive material, the organic polymer, and the air electrode catalyst, and coating the surface of LDH separator 112 with the paste. Preparation of the paste can be carried out by appropriately adding the organic polymer (binder resin) and an organic solvent to a mixture of the hydroxide ion conductive material, the electron conductive material, and the air electrode catalyst, and using a known kneader such as a three-roll mill. Preferred examples of the organic solvent include alcohols such as butyl carbitol and terpineol, acetic acid ester-based solvents such as butyl acetate, and N-methyl-2-pyrrolidone. Coating LDH separator 112 with the paste can be carried out by printing. This printing can be carried out by various known printing methods, but a screen printing is preferred.

Figure 10:
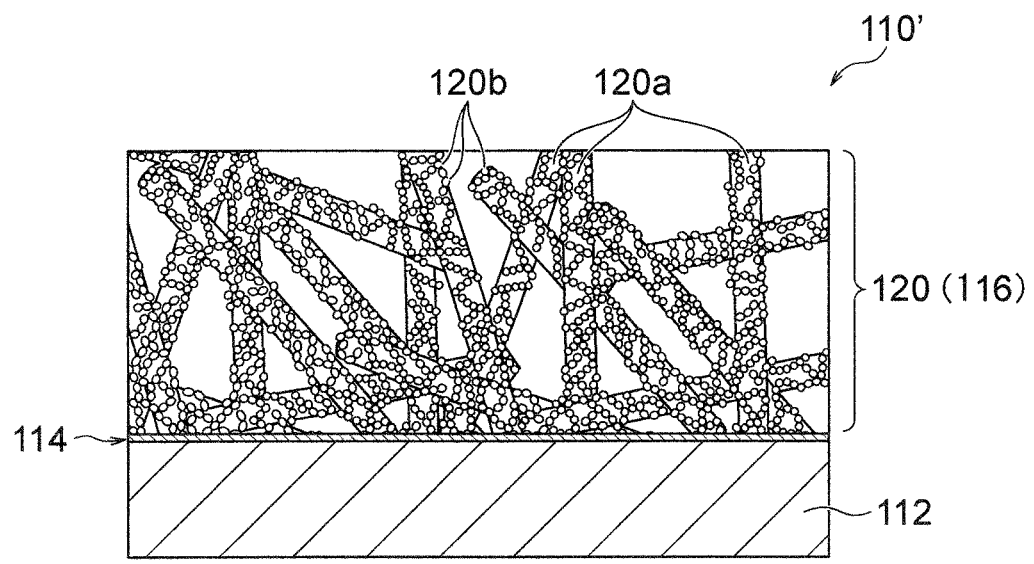
FIG. 10 is a schematic cross-sectional view conceptually illustrating another preferred embodiment of an air electrode/separator assembly (a portion other than a rigid porous layer).

However, air electrode layer 116 may not have internal catalyst layer 118 as in air electrode/separator assembly 110' shown in FIG. 10. In this case, it is desirable to take measures to reduce the contact resistance by uniformly applying pressure to air electrode layer 116 and LDH separator 112 so that outermost catalyst layer 120 and interface layer 114 are adhered to each other.

As described above, air electrode/separator assembly 110 is preferably used for a metal-air secondary battery. Namely, a preferred embodiment of the present invention provides a metal-air secondary battery comprising air electrode/separator assembly 110, a metal negative electrode, and an electrolyte, wherein the electrolyte is separated from air electrode layer 116 by LDH separator 112 interposed therebetween. A zinc-air secondary battery including a zinc electrode as a metal negative electrode is particularly preferable. Further, a lithium-air secondary battery including a lithium electrode as a metal negative electrode may be used.

LDH Separator

LDH separator 18 according to a preferred embodiment of the present invention will be described below. Although the following description assumes a zinc-air secondary battery, LDH separator 18 according to the present embodiment can also be applied to other metal-air secondary batteries such as a lithium-air secondary battery. As described above, LDH separator 18 of the present embodiment contains a porous substrate 18a and a hydroxide ion conductive layered compound 18b as conceptually shown in FIG. 8. In FIG. 8, the region of hydroxide ion conductive layered compound 18b is drawn so as not to be connected between the upper surface and the lower surface of LDH separator 18, but it is because the figure is drawn two-dimensionally as a cross section. When the depth thereof is three-dimensionally taken into account, the region of hydroxide ion conductive layered compound 18b is connected between the upper surface and the lower surface of LDH separator 18, whereby the hydroxide ion conductivity of LDH separator 18 is secured. Porous substrate 18a is made of a polymer material, and the pores of porous substrate 18a are clogged up with hydroxide ion conductive layered compound 18b. However, the pores of porous substrate 18a may not be completely clogged up, and residual pores P can be slightly present. By clogging up the pores of polymer porous substrate 18a with hydroxide ion conductive layered compound 18b to make the substrate highly densified in this way, LDH separator 18 capable of even more effectively inhibiting short circuits due to zinc dendrites can be provided.

Moreover, LDH separator 18 of the present embodiment has excellent flexibility and strength in addition to desirable ion conductivity required of a separator due to the hydroxide ion conductivity of hydroxide ion conductive layered compound 18b. This is due to the flexibility and strength of polymer porous substrate 18a itself contained in LDH separator 18. Namely, since LDH separator 18 is densified so that the pores of polymer porous substrate 18a are sufficiently clogged up with hydroxide ion conductive layered compound 18b, polymer porous substrate 18a and hydroxide ion conductive layered compound 18b are integrated in complete harmony as a highly composited material, and therefore the rigidity and brittleness due to hydroxide ion conductive layered compound 18b, which is a ceramic material, can be said to be offset or reduced by the flexibility and strength of polymer porous substrate 18a.

LDH separator 18 of the present embodiment desirably has extremely few residual pores P (the pores not clogged up with hydroxide ion conductive layered compound 18b). Due to residual pores P, LDH separator 18 has, for example, an average porosity of 0.03% or more and less than 1.0%, preferably 0.05% or more and 0.95% or less, more preferably 0.05% or more and 0.9% or less, still more preferably 0.05 to 0.8%, and most preferably 0.05 to 0.5%. With an average porosity within the above range, the pores of polymer porous substrate 18a are sufficiently clogged up with hydroxide ion conductive layered compound 18b, to provide an extremely high denseness, which therefore can inhibit short circuits due to zinc dendrite even more effectively. Further, significantly high ionic conductivity can be realized, and LDH separator 18 can exhibit a sufficient function as a hydroxide ion conductive dense separator. The measurement of the average porosity can be carried out by a) polishing the cross section of the LDH separator with a cross section polisher (CP), and b) using an FE-SEM (field-emission scanning electron microscope) at a magnification of 50,000× to acquire images of two fields of vision of the cross-sectional of the functional layer, and c) calculating the porosity of each of the two fields of vision by using an image inspection software (for example, HDevelop, manufactured by MVTec Software GmbH) based on the image data of the acquired cross-sectional image and determining the average value of the obtained porosities.

LDH separator 18 is a separator containing hydroxide ion conductive layered compound 18b, and separates a positive electrode plate and a negative electrode plate such that hydroxide ions can be conducted when the separator is incorporated in a zinc secondary battery. Namely LDH separator 18 exhibits a function as a hydroxide ion conductive dense separator. Therefore, LDH separator 18 has gas impermeability and/or water impermeability. Thus, LDH separator 18 is preferably densified so as to have gas impermeability and/or water impermeability. As described in Patent Literatures 2 to 4, "having gas impermeability"

herein means that even when helium gas is brought into contact with one side of the object to be measured in water at a differential pressure of 0.5 atm, no bubbles are generated due to the helium gas from another surface side. Further, as used herein, "having water impermeability" means that water in contact with one side of the object to be measured does not permeate to the other side as described in Patent Literatures 2 to 4. Namely, LDH separator 18 having gas impermeability and/or water impermeability means LDH separator 18 having a high degree of denseness such that it does not allow gas or water to pass through, and means that LDH separator 18 is not a porous film or other porous material that has water permeability or gas permeability. In this way, LDH separator 18 selectively allows hydroxide ions alone to pass through due to its hydroxide ion conductivity and can exhibit a function as a battery separator. Therefore, the configuration is extremely effective in physically blocking penetration of the separator by the zinc dendrite generated upon charge to prevent a short circuit between the positive and negative electrodes. Since LDH separator 18 has hydroxide ion conductivity, it is possible to efficiently move the required hydroxide ions between the positive electrode plate and the negative electrode plate, and to realize the charge/discharge reaction in the positive electrode plate and the negative electrode plate.

LDH separator 18 preferably has a He permeability of 3.0 cm/min·atm or less per unit area, more preferably 2.0 cm/min·atm or less, and still more preferably 1.0 cm/min·atm or less. A separator having a He permeability of 3.0 cm/min·atm or less can extremely effectively inhibit Zn permeation (typically permeation of zinc ion or zinc acid ion) in an electrolyte. It is considered in principle that due to such significant inhibition of Zn penetration, the separator of the present embodiment can inhibit effectively the growth of zinc dendrite when used in a zinc secondary battery. The He permeability is measured by supplying He gas to one surface of the separator to allow the He gas to pass through the separator, and calculating the He permeability to evaluate the denseness of the hydroxide ion conductive dense separator. The He permeability is calculated by the formula of $F/(P \times S)$ by using the permeation amount F of the He gas per unit time, the differential pressure P applied to the separator when the He gas permeates, and the membrane area S through which the He gas permeates. By evaluating the gas permeability using the He gas in this way, it is possible to evaluate the presence or absence of denseness at an extremely high level, and as a result, it is possible to effectively evaluate a high degree of denseness such that substances other than hydroxide ions (in particular Zn bringing about zinc dendrite growth) can be permeated as little as possible (only a very small amount is permeated). This is because an He gas has the smallest constituent unit among a wide variety of atoms or molecules that can form a gas and also has extremely low reactivity. Namely, He constitutes a He gas by a single He atom without forming a molecule. In this respect, hydrogen gas is composed of $H_2$ molecules, and the He atom alone is smaller as a gas constituent unit. In the first place, $H_2$ gas is dangerous because it is a flammable gas. Then, by adopting the index of He gas permeability defined by the above formula, it is possible to easily evaluate the denseness objectively regardless of the difference in various sample sizes and measurement conditions. In this way, it is possible to easily, safely and effectively evaluate whether or not the separator has sufficiently high denseness suitable for a zinc secondary battery separator. The measurement of He permeability can be preferably carried out according to the procedure in Patent Literatures 2 and 4.

In LDH separator 18, hydroxide ion conductive layered compound 18b, which is an LDH and/or LDH-like compound, clogs up the pores of porous substrate 18a. As is generally known, LDH is composed of a plurality of hydroxide basic layers and an intermediate layer interposed between the plurality of hydroxide basic layers. The basic hydroxide layer is mainly composed of metal elements (typically metal ions) and OH groups. The intermediate layer of LDH is composed of anions and $H_2O$. The anion is a mono- or higher-valent anion and preferably a monovalent or divalent ion. The anion in LDH preferably contains $OH^-$ and/or $CO_3^{2-}$. LDH also has excellent ion conductivity due to its unique properties.

In general, LDH has been known as a compound represented by the basic composition formula: $M^{2+}_{1-x}M^{3+}_x(OH)_2 A^{n-}_{x/n} \cdot mH_2O$ wherein $M^{2+}$ is a divalent cation, $M^{3+}$ is a trivalent cation, $A^{n-}$ is an n-valent anion, n is an integer of 1 or more, x is 0.1 to 0.4, and m is 0 or more. In the above basic composition formula, $M^{2+}$ can be arbitrary divalent cation, but preferred examples thereof include $Mg^{2+}$, $Ca^{2+}$ and $Zn^{2+}$, and it is more preferably $Mg^{2+}$. $M^{3+}$ can be arbitrary trivalent cation, a preferred example thereof includes $Al^{3+}$ or $Cr^{3+}$, and it is more preferably $Al^{3+}$. $A^{n-}$ can be arbitrary anion, and preferred examples thereof include $OH^-$ and $CO_3^{2-}$. Therefore, in the above basic composition formula, it is preferred that $M^{2+}$ include $Mg^{2+}$, $M^{3+}$ include $Al^{3+}$, and $A^{n-}$ include $OH^-$ and/or $CO_3^{2-}$. n is an integer of 1 or more, and is preferably 1 or 2. x is 0.1 to 0.4 and preferably 0.2 to 0.35. m is an arbitrary numeral meaning the number of moles of water, is greater than or equal to 0, typically a real number greater than 0 or greater than or equal to 1. However, the above basic composition formula is merely a representatively exemplified formula of the "basic composition" of LDH, generally, and the constituent ions can be appropriately replaced. For example, in the above basic composition formula, some or all of $M^{3+}$ may be replaced with a tetra- or higher-valent cation, and in that case, the coefficient x/n of anion $A^{n-}$ in the above formula may be appropriately changed.

For example, the hydroxide basic layer of LDH may contain Ni, Al, Ti and OH groups. The intermediate layer is composed of anions and $H_2O$ as described above. The alternating laminated structure of the hydroxide basic layer and the intermediate layer, itself is basically the same as the generally known LDH alternating laminated structure, but the LDH of the present embodiment in which the hydroxide basic layer of LDH is composed of predetermined elements or ions including Ni, Al, Ti and OH groups can exhibit excellent alkali resistance. The reason for this is not necessarily clear, but it is considered that Al, which has been conventionally thought to be easy to elute in an alkaline solution, is less likely to elute in an alkaline solution due to some interaction with Ni and Ti in the LDH of the present embodiment. Nevertheless, LDH of the present embodiment can also exhibit high ion conductivity suitable for use as a separator for an alkaline secondary battery. Ni in LDH can be in the form of nickel ions. Nickel ions in LDH are typically considered to be $Ni^{2+}$ but are not particularly limited thereto as other valences such as $Ni^{3+}$ are possible. Al in LDH can be in the form of aluminum ions. Aluminum ions in LDH are typically considered to be $Al^{3+}$ but are not particularly limited thereto as other valences are possible. Ti in LDH can be in the form of titanium ions. Titanium ions in LDH are typically considered to be $Ti^{4+}$ but are not particularly limited thereto as other valences such as $Ti^{3+}$ are possible. The hydroxide basic layer may contain other elements or ions as long as it contains at least Ni, Al, Ti and OH groups. However, the hydroxide basic layer preferably contains Ni, Al, Ti and OH groups as main components. Namely, the hydroxide basic layer is preferably mainly composed of Ni, Al, Ti and OH groups. Therefore, the hydroxide basic layer is typically composed of Ni, Al, Ti, OH groups and, in some cases, unavoidable impurities. The unavoidable impurity is an arbitrary element that can be unavoidably mixed due to the production process, and can be mixed in LDH, for example, derived from a raw material or a substrate. As described above, the valences of Ni, Al and Ti are not always fixed, and it is impractical or impossible to specify LDH strictly by a general formula. Assuming that the hydroxide basic layer is mainly composed of $Ni^{2+}$, $Al^{3+}$, $Ti^{4+}$ and OH groups, the corresponding LDH has the basic composition that can be represented by the formula: $Ni^{2+}_{1-x-y}Al^{3+}_{x}Ti^{4+}_{y}(OH)_2 A^{n-}_{(x+2y)/n} \cdot mH_2O$ wherein $A^{n-}$ is an n-valent anion, n is an integer of 1 or more and preferably 1 or 2, $0<x<1$ and preferably $0.01 \leq x \leq 0.5$, $0<y<1$ and preferably $0.01 \leq y \leq 0.5$, $0<x+y<1$, m is 0 or more and typically a real number greater than 0 or greater than or equal to 1. However, the above formula is understood as "basic composition", and it is understood that elements such as $Ni^{2+}$, $Al^{3+}$, and $Ti^{4+}$ are replaceable with other elements or ions (including the same elements or ions having other valences, or elements or ions unavoidably mixed due to the production process) to an extent such that the basic characteristics of LDH are not impaired.

The LDH-like compound is a hydroxide and/or oxide having a layered crystal structure like to LDH but is a compound that may not be called LDH, and the LDH-like compound preferably contains Mg, and one or more elements selected from the group consisting of, Ti, Y and Al and containing at least Ti. As described above, by using an LDH-like compound that is a hydroxide and/or an oxide having a layered crystal structure containing at least Mg and Ti, instead of the conventional LDH, as the hydroxide ion conductive substance, a hydroxide ion conductive separator can be provided that is excellent in the alkali resistance and capable of inhibiting a short circuit due to zinc dendrite even more effectively. Therefore, a preferred LDH-like compound is a hydroxide and/or oxide having a layered crystal structure containing Mg, and one or more elements selected from the group consisting of Ti, Y and Al and containing at least Ti. Therefore, a typical LDH-like compound is a composite hydroxide and/or composite oxide of Mg, Ti, optionally Y and optionally Al, and particularly preferably a composite hydroxide and/or composite oxide of Mg, Ti, Y and Al. The above elements may be replaced with other elements or ions to an extent such that the basic properties of the LDH-like compound are not impaired, but the LDH-like compound preferably contains no Ni.

LDH-like compounds can be identified by X-ray diffraction. Specifically, when X-ray diffraction is carried out on the surface of the LDH separator, a peak assigned to the LDH-like compound is detected typically in the range of 5° 5.20510°, and more typically in the range of 7° 5205.10°. As described above, the LDH is a substance having an alternating laminated structure in which exchangeable anions and $H_2O$ are present as an intermediate layer between the stacked hydroxide basic layers. In this regard, when LDH is analyzed by the X-ray diffraction method, a peak assigned to the crystal structure of LDH (i.e., the peak assigned to (003) of LDH) is originally detected at a position of 28=11 to 12°. When the LDH-like compound is analyzed by the X-ray diffraction method, on the other hand, a peak is typically detected in the aforementioned range shifted to the lower angle side than the above peak position of LDH. Further, the interlayer distance of the layered crystal structure can be determined by Bragg's equation using 28 corresponding to the peak assigned to the LDH-like compound in X-ray diffraction. The interlayer distance of the layered crystal structure of the LDH-like compound thus determined is typically 0.883 to 1.8 nm, and more typically 0.883 to 1.3 nm.

The atomic ratio of Mg/(Mg+Ti+Y+Al) in the LDH-like compound, as determined by energy dispersive X-ray analysis (EDS), is preferably 0.03 to 0.25 and more preferably 0.05 to 0.2. Moreover, the atomic ratio of Ti/(Mg+Ti+Y+Al) in the LDH-like compound is preferably 0.40 to 0.97 and more preferably 0.47 to 0.94. Further, the atomic ratio of Y/(Mg+Ti+Y+Al) in the LDH-like compound is preferably 0 to 0.45 and more preferably 0 to 0.37. Further, the atomic ratio of Al/(Mg+Ti+Y+Al) in the LDH-like compound is preferably 0 to 0.05 and more preferably 0 to 0.03. Within the above ranges, the alkali resistance is more excellent, and the effect of inhibiting a short circuit due to zinc dendrite (i.e., dendrite resistance) can be more effectively realized. By the way, LDH conventionally known for LDH separators has the basic composition that can be represented by the formula: $M^{2+}_{1-x}M^{3+}_{x}(OH)_2 A^{n-}_{x/n} \cdot mH_2O$, wherein $M^{2+}$ is a divalent cation, $M^{3+}$ is a trivalent cation, $A^{n-}$ is an n-valent anion, n is an integer of 1 or more, x is 0.1 to 0.4, and m is 0 or more. The atomic ratios in the LDH-like compound generally deviate from those in the above formula for LDH. Therefore, the LDH-like compound generally can be said to have a composition ratio (atomic ratio) different from that of the conventional LDH. EDS analysis is preferably carried out with an EDS analyzer (for example, X-act, manufactured by Oxford Instruments Plc.), by 1) capturing an image at an acceleration voltage of 20 kV and a magnification of 5,000×, 2) carrying out three-point analysis at intervals of about 5 μm in the point analysis mode, 3) repeating the above 1) and 2) once more, and 4) calculating the average value of a total of 6 points.

As described above, LDH separator 18 contains hydroxide ion conductive layered compound 18b and porous substrate 18a (typically LDH separator 18 is composed of porous substrate 18a and hydroxide ion conductive layered compound 18b), and the LDH clogs up pores of the porous substrate so that LDH separator 18 exhibits hydroxide ion conductivity and gas impermeability (hence to function as an LDH separator exhibiting hydroxide ion conductivity). Hydroxide ion conductive layered compound 18b is particularly preferably incorporated over the entire area of polymer porous substrate 18a in the thickness direction. The thickness of the LDH separator is preferably 3 to 80 μm, more preferably 3 to 60 μm, and still more preferably 3 to 40 μm.

Porous substrate 18a is made of a polymer material. Polymer porous substrate 18a has advantages of 1) having flexibility (hence, polymer porous substrate 18a hardly cracks even when it is thin.), 2) facilitating increase in porosity, and 3) facilitating increase in conductivity (it can be thin while having increased porosity.), and 4) facilitating manufacture and handling. Further, taking advantage derived from the flexibility of 1) above, it also has an advantage of 5) ease in bending or sealing/bonding the LDH separator containing a porous substrate made of a polymer material. Preferred examples of the polymer material include polystyrene, polyether sulfone, polypropylene, an epoxy resin, polyphenylene sulfide, a fluororesin (tetrafluororesin: PTFE, etc.), cellulose, nylon, polyethylene and any combination thereof. In view of a thermoplastic resin suitable for heat pressing, more preferred examples include polystyrene, polyether sulfone, polypropylene, an epoxy resin, polyphenylene sulfide, a fluororesin (tetrafluororesin: PTFE, etc.), nylon, polyethylene and any combination thereof. All of the various preferred materials described above have the alkali resistance, which serves as a resistance to the electrolyte of the battery. Particularly preferable polymer materials are polyolefins such as polypropylene and polyethylene and most preferably polypropylene or polyethylene in terms of excellent hot water resistance, acid resistance and alkali resistance as well low cost. When the porous substrate is made of a polymer material, the hydroxide ion conductive layered compound is particularly preferably incorporated over the entire porous substrate in the thickness direction (for example, most or almost all of the pores inside the porous substrate are filled with the hydroxide ion conductive layered compound.). As such a polymer porous substrate, a commercially available polymer microporous membrane can be preferably used.

The LDH separator of the present embodiment can be produced by (i) fabricating the hydroxide ion conductive layered compound-containing composite material according to a known method (see, for example, Patent Literatures 1 to 4) by using a polymer porous substrate, and (ii) pressing this hydroxide ion conductive layered compound-containing composite material. The pressing method may be, for example, a roll press, a uniaxial pressure press, a CIP (cold isotropic pressure press), etc., and is not particularly limited. The pressing method is preferably by a roll press. This pressing is preferably carried out while heating in terms of softening the porous substrate to enable to clog up sufficiently the pores of the porous substrate with the hydroxide ion conductive layered compound. For example, for polypropylene or polyethylene, the temperature for sufficient softening is preferably heated at 60 to 200° C. Pressing by, for example, a roll press in such a temperature range can significantly reduce the average porosity derived from the residual pores of the LDH separator; as a result, the LDH separator can be extremely highly densified, and hence short circuits due to zinc dendrites can be inhibited even more effectively. When carrying out the roll pressing, the form of the residual pores can be controlled by appropriately adjusting the roll gap and the roll temperature, whereby an LDH separator having a desired denseness or average porosity can be obtained.

The method for producing the hydroxide ion conductive layered compound-containing composite material (i.e., the crude LDH separator) before pressing is not particularly limited, and it can be fabricated by appropriately changing the conditions in a known method for producing an LDH-containing functional layer and a composite material (i.e., LDH separator) (see, for example, Patent Literatures 1 to 4). For example, the hydroxide ion conductive layered compound-containing functional layer and the composite material (i.e., an LDH separator) can be produced by (1) providing a porous substrate, (2) coating the porous substrate with a titanium oxide sol or a mixed sol of alumina and titania followed by heat treatment to form a titanium oxide layer or alumina/titania layer, (3) immersing the porous substrate in a raw material aqueous solution containing nickel ions ($Ni^{2+}$) and urea, and (4) treating hydrothermally the porous substrate in the raw material aqueous solution to form a hydroxide ion conductive layered compound-containing functional layer on the porous substrate and/or in the porous substrate. In particular, forming of the titanium oxide layer or the alumina/titania layer on the porous substrate in the above step (2) provides not only the raw material of the hydroxide ion conductive layered compound, but also the function as a starting point of the crystal growth of the hydroxide ion conductive layered compound to enable to form uniformly a highly densified hydroxide ion conductive layered compound-containing functional layer in the porous substrate. Further, the urea present in the above step (3) generates ammonia in the solution by utilizing the hydrolysis of the urea to raise the pH value, which allows the coexisting metal ions to form a hydroxide to obtain a hydroxide ion conductive layered compound. In addition, since the hydrolysis involves the generation of carbon dioxide, a hydroxide ion conductive layered compound having an anion of carbonate ion type can be obtained.

In particular, when fabricating a composite material including a porous substrate made of a polymer material in which the functional layer is incorporated over the entire porous substrate in the thickness direction (i.e., an LDH separator), the substrate is preferably coated with the mixed sol of alumina and titania in the above (2) so as to permeate the whole or most of the inside of the substrate with the mixed sol. In this way, most or almost all the pores inside the porous substrate can be finally filled with the hydroxide ion conductive layered compound. Examples of a preferable coating method include a dip coating and a filtration coating, and a dip coating is particularly preferable. By adjusting the number of times of coating by the dip coating, etc., the amount of the mixed sol adhered can be adjusted. The substrate coated with the mixed sol by dip coating, etc. may be dried and then the above steps (3) and (4) may be carried out.

What is claimed is:

1. An air electrode/separator assembly, comprising:
   a rigid porous layer having rigidity and air permeability, wherein the rigidity is defined as a proportion of displacement in a compression direction of less than 3% when pressurized at 0.1 MPa,
   an air electrode layer that covers both sides of the rigid porous layer, or both sides and end faces of the rigid porous layer provided that at least one end face is excluded, and
   a layered double hydroxide (LDH) separator that covers an outside of the air electrode layer,
   wherein:
   i) the rigid porous layer is made of a metal or an electrically conductive ceramic, whereby the rigid porous layer itself functions as a positive electrode current collector, or
   ii) the rigid porous layer is made of an insulating material and is covered with a porous metal layer, whereby the porous metal layer functions as a positive electrode current collector.

2. The air electrode/separator assembly according to claim 1, wherein the LDH separator is composited with a polymer porous substrate.

3. A zinc-air secondary battery comprising a plurality of air electrode/separator assemblies according to claim 1, comprising:
   a plurality of the air electrode/separator assemblies,
   a plurality of negative electrode plates alternating with the air electrode/separator assemblies, and comprising a negative electrode active material layer comprising at least one selected from the group consisting of zinc, zinc oxide, a zinc alloy and a zinc compound, and a negative electrode current collector,
   an electrolyte permeating the negative electrode plate and the LDH separator, a battery case that houses vertically the plurality of air electrode/separator assemblies, the plurality of negative electrode plates, and the electrolyte, wherein the plurality of negative electrode plates and the electrolyte are housed in a closed space defined by the battery case and the plurality of air electrode/separator assemblies, leaving an upper surplus space, and the plurality of air electrode/separator assemblies are allowed to contact an outside air through an opening of the battery case, and wherein the battery case further comprises a pressure release valve that enables release of a gas that may be generated inside the battery, at a position facing or communicating with the upper surplus space.

4. The zinc-air secondary battery according to claim 3, wherein the plurality of air electrode/separator assemblies are disposed so that end faces of the rigid porous layers not covered with the LDH separators face upward, wherein the zinc-air secondary battery comprises:
a positive electrode current collecting member connected to upper ends of the plurality of positive electrode current collectors via end faces of the rigid porous layers not covered with the LDH separators,
a positive electrode current collector terminal connected to the positive electrode current collecting member and extending from the battery case,
a plurality of negative electrode current collector tabs extending laterally from lateral end portions of the plurality of negative electrode current collectors, and
a negative electrode current collector terminal connected to the plurality of negative electrode current collector tabs and extending from the battery case.

5. The zinc-air secondary battery according to claim 4, wherein the positive electrode current collecting member has a porous structure having air permeability.

6. The zinc-air secondary battery according to claim 4, wherein a plurality of the air electrode/separator assemblies and the plurality of negative electrode plates are laterally packed without any gap in the battery case and compressed in a thickness direction of the air electrode/separator assembly and the negative electrode plate by an inner wall of the battery case.

7. The zinc-air secondary battery according to claim 4, further comprising a fan above the battery case, for flowing an air into the rigid porous layer via an end face of the rigid porous layer not covered with the LDH separator.

8. The zinc-air secondary battery according to claim 3, wherein the plurality of air electrode/separator assemblies are disposed so that end faces of the rigid porous layers not covered with the LDH separators face upward, wherein the zinc-air secondary battery comprises:
a positive electrode current collecting member connected to upper ends of the plurality of positive electrode current collectors via end faces of the rigid porous layers not covered with the LDH separators,
a positive electrode current collector terminal connected to the positive electrode current collecting member and extending from the battery case,
a plurality of negative electrode current collector tabs extending upward and/or laterally from upper ends of the plurality of negative electrode current collectors, and
a negative electrode current collector terminal connected to the plurality of negative electrode current collector tabs and extending from the battery case.

9. The zinc-air secondary battery according to claim 8, wherein the positive electrode current collecting member has a porous structure having air permeability.

10. The zinc-air secondary battery according to claim 8, wherein a plurality of the air electrode/separator assemblies and the plurality of negative electrode plates are laterally packed without any gap in the battery case and compressed in a thickness direction of the air electrode/separator assembly and the negative electrode plate by an inner wall of the battery case.

11. The zinc-air secondary battery according to claim 8, further comprising a fan above the battery case, for flowing an air into the rigid porous layer via an end face of the rigid porous layer not covered with the LDH separator.

12. The zinc-air secondary battery according to claim 3, wherein the plurality of air electrode/separator assemblies are disposed so that end faces of the rigid porous layers not covered with the LDH separator face downward, wherein the zinc-air secondary battery comprises:
a positive electrode current collecting member connected to lower ends of the plurality of positive electrode current collectors via end faces of the rigid porous layers not covered with the LDH separators,
a positive electrode current collector terminal connected to the positive electrode current collecting member and extends from the battery case,
a negative electrode current collecting member provided in the upper surplus space and connected to upper ends of the plurality of negative electrode current collectors, and
a negative electrode current collector terminal connected to the negative electrode current collecting member and extending from the battery case.

13. The zinc-air secondary battery according to claim 12, wherein the positive electrode current collecting member has a porous structure having air permeability.

14. The zinc-air secondary battery according to claim 12, wherein a plurality of the air electrode/separator assemblies and the plurality of negative electrode plates are laterally packed without any gap in the battery case and compressed in a thickness direction of the air electrode/separator assembly and the negative electrode plate by an inner wall of the battery case.

15. The zinc-air secondary battery according to claim 12, further comprising a fan below the battery case, for flowing an air into the rigid porous layer via an end face of the rigid porous layer not covered with the LDH separator.

16. The zinc-air secondary battery according to claim 3, wherein the plurality of air electrode/separator assemblies are disposed so that end faces of the rigid porous layers not covered with the LDH separator face downward, wherein the zinc-air secondary battery comprises:
a positive electrode current collecting member connected to lower ends of the plurality of positive electrode current collectors via end faces of the rigid porous layers not covered with the LDH separators,
a positive electrode current collector terminal connected to the positive electrode current collecting member and extending from the battery case,
a negative electrode current collecting member provided in the upper surplus space and connected to upper ends of the plurality of negative electrode current collectors, and
a negative electrode current collector terminal connected to the negative electrode current collecting member and extending from an upper surface of the battery case, and wherein the LDH separator is configured in a continuous elongated shape facing the plurality of air electrode/separator assemblies and the plurality of negative electrode plates, the elongated LDH separator is formed into a zigzag folded structure, and a laminate of the air electrode layer and the rigid porous layer, and the negative electrode plate are alternately housed in a plurality of compartments defined by the zigzag folded structure, whereby the air electrode layer and the negative electrode plate are separated from each other via the LDH separator.

17. The zinc-air secondary battery according to claim 16, wherein lateral ends of the elongated LDH separator that are adjacent to each other sandwiching the negative electrode plate therebetween, are heat-sealed so as to close a side end of the negative electrode plate, whereby a negative electrode plate-housing portion of the elongated LDH separator forms a baggy structure in which the electrolyte is housed.

18. The zinc-air secondary battery according to claim 16, wherein a longitudinal end portion of the elongated LDH separator and/or a lateral end portion of the elongated LDH separator are/is fixed to an inner wall of the battery case.

19. The zinc-air secondary battery according to claim 16, wherein the positive electrode current collecting member has a porous structure having air permeability.

20. The zinc-air secondary battery according to claim 16, wherein a plurality of the air electrode/separator assemblies and the plurality of negative electrode plates are laterally packed without any gap in the battery case and compressed in a thickness direction of the air electrode/separator assembly and the negative electrode plate by an inner wall of the battery case.

21. The zinc-air secondary battery according to claim 16, further comprising a fan below the battery case, for flowing an air into the rigid porous layer via an end face of the rigid porous layer not covered with the LDH separator.

22. The zinc-air secondary battery according to claim 3, wherein the plurality of air electrode/separator assemblies are disposed so that end faces of the rigid porous layers not covered with the LDH separators face downward,
wherein the zinc-air secondary battery comprises:
a positive electrode current collecting member connected to lower ends of the plurality of positive electrode current collectors via end faces of the rigid porous layers not covered with the LDH separators,
a positive electrode current collector terminal connected to the positive electrode current collecting member and extending from the battery case,
a negative electrode current collecting member provided in the upper surplus space and connected to upper ends of the plurality of negative electrode current collectors, and
a negative electrode current collector terminal connected to the negative electrode current collecting member and extending from a side surface of the battery case, and
wherein the LDH separator is configured in a continuous elongated shape facing the plurality of air electrode/separator assemblies and the plurality of negative electrode plates, the elongated LDH separator is formed into a zigzag folded structure, and a laminate of the air electrode layer and the rigid porous layer, and the negative electrode plate are alternately housed in a plurality of compartments defined by the zigzag folded structure, whereby the air electrode layer and the negative electrode plate are separated from each other via the LDH separator.

23. The zinc-air secondary battery according to claim 22, wherein lateral ends of the elongated LDH separator that are adjacent to each other sandwiching the negative electrode plate therebetween, are heat-sealed so as to close a side end of the negative electrode plate, whereby a portion of the elongated LDH separator housing the negative electrode plate forms a baggy structure in which the electrolyte is housed.

24. The zinc-air secondary battery according to claim 22, wherein a longitudinal end portion of the elongated LDH separator and/or a lateral end portion of the elongated LDH separator are/is fixed to an inner wall of the battery case.

25. The zinc-air secondary battery according to claim 22, wherein the positive electrode current collecting member has a porous structure having air permeability.

26. The zinc-air secondary battery according to claim 22, wherein a plurality of the air electrode/separator assemblies and the plurality of negative electrode plates are laterally packed without any gap in the battery case and compressed in a thickness direction of the air electrode/separator assembly and the negative electrode plate by an inner wall of the battery case.

27. The zinc-air secondary battery according to claim 22, further comprising a fan below the battery case, for flowing an air into the rigid porous layer via an end face of the rigid porous layer not covered with the LDH separator.

* * * * *